(12) United States Patent
Peng et al.

(10) Patent No.: US 12,093,592 B2
(45) Date of Patent: Sep. 17, 2024

(54) PICTURE DISPLAYING METHOD AND APPARATUS, AND ELECTRONIC DEVICE

(71) Applicant: Beijing Bytedance Network Technology Co., Ltd., Beijing (CN)

(72) Inventors: Bang Peng, Beijing (CN); Wangbang Wu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/256,617

(22) PCT Filed: Dec. 1, 2021

(86) PCT No.: PCT/CN2021/134887
§ 371 (c)(1),
(2) Date: Jun. 8, 2023

(87) PCT Pub. No.: WO2022/135093
PCT Pub. Date: Jun. 30, 2022

(65) Prior Publication Data
US 2024/0036792 A1    Feb. 1, 2024

(30) Foreign Application Priority Data
Dec. 25, 2020    (CN) .......................... 202011566807.3

(51) Int. Cl.
*G06F 3/14*        (2006.01)
*G09G 5/36*        (2006.01)

(52) U.S. Cl.
CPC ................. *G06F 3/14* (2013.01); *G09G 5/36* (2013.01); *G09G 2340/0407* (2013.01)

(58) Field of Classification Search
CPC ..... G06F 3/14; G09G 5/36; G09G 2340/0407
See application file for complete search history.

(56) References Cited

U.S. PATENT DOCUMENTS 8,947,595 B1    2/2015 Tucker et al.
2013/0135179 A1*  5/2013 Ko .......................... G09G 5/00
                                                              709/219

(Continued)

FOREIGN PATENT DOCUMENTS

CN         1408168 A      4/2003
CN       103530079 A      1/2014

(Continued)

OTHER PUBLICATIONS

ISA China National Intellectual Property Administration, International Search Report Issued in Application No. PCT/CN2021/134887, Feb. 18, 2022, WIPO, 13 pages.

(Continued)

*Primary Examiner* — Ryan A Lubit
(74) *Attorney, Agent, or Firm* — Alleman Hall & Tuttle LLP

(57) ABSTRACT

Embodiments of the present disclosure provide a picture displaying method and apparatus, an electronic device, a storage medium and a computer program product. The method includes: acquiring a first resolution of a display screen of a client; adjusting, according to the first resolution, a to-be-output picture to obtain an effective display picture, where the effective display picture is displayed at a same ratio as a ratio of the first resolution; and transmitting the effective display picture to the client for display. According to the embodiments of the present disclosure, for clients of different resolutions, with an assurance that no black edge or distortion appears in a picture displayed in the client, an effect of one server terminal being capable of supporting clients of various different resolutions is achieved, thereby reducing the complexity of server terminal management, and improving the device utilization of the server terminal.

17 Claims, 12 Drawing Sheets

(56) References Cited

U.S. PATENT DOCUMENTS

| | | | |
|---|---|---|---|
| 2014/0086552 A1 | 3/2014 | Cheng | |
| 2014/0118354 A1* | 5/2014 | Pais | G09G 5/373 345/428 |
| 2016/0055621 A1* | 2/2016 | Cai | H04N 1/2361 345/669 |
| 2016/0366454 A1* | 12/2016 | Tatourian | G06F 3/14 |
| 2017/0365032 A1* | 12/2017 | Westerhoff | H04L 51/10 |
| 2020/0304754 A1 | 9/2020 | Thien et al. | |

FOREIGN PATENT DOCUMENTS

| | | |
|---|---|---|
| CN | 103546715 A | 1/2014 |
| CN | 103713874 A | 4/2014 |
| CN | 104679466 A | 6/2015 |
| CN | 105955689 A | 9/2016 |
| CN | 106303573 A | 1/2017 |
| CN | 106899620 A | 6/2017 |
| CN | 107613238 A | 1/2018 |
| CN | 108363604 A | 8/2018 |
| CN | 109408165 A | 3/2019 |
| CN | 110286868 A | 9/2019 |
| CN | 110691259 A | 1/2020 |
| CN | 111124334 A | 5/2020 |
| CN | 111147893 A | 5/2020 |
| CN | 112738541 A | 4/2021 |
| EP | 1806730 A1 | 7/2007 |
| EP | 3211911 A1 | 8/2017 |
| JP | 2010124381 A | 6/2010 |

OTHER PUBLICATIONS

China National Intellectual Property Administration, Office action issued in Chinese Application No. 202011566807.3, Jun. 15, 2022, 17 pages.

China National Intellectual Property Administration, Office action issued in Chinese Application No. 202011566807.3, Jan. 12, 2023, 7 pages (submitted with English summary).

China National Intellectual Property Administration, Notice of Grant Issued in Application No. 202011566807.3, Apr. 15, 2023, 5 pages.

European Patent Office, Extended European Search Report Issued in Application No. 21909090.9, Apr. 24, 2024, 7 pages.

* cited by examiner

PICTURE DISPLAYING METHOD AND APPARATUS, AND ELECTRONIC DEVICE

CROSS-REFERENCE TO RELATED APPLICATION

This application is a National Stage of International Application No. PCT/CN2021/134887, filed on Dec. 1, 2021, which claims priority to Chinese Patent Application No. 202011566807.3, filed on Dec. 25, 2020, entitled "PICTURE DISPLAYING METHOD AND APPARATUS, AND ELECTRONIC DEVICE". The contents of the above patent applications are hereby incorporated by reference in their entireties.

TECHNICAL FIELD

Embodiments of the present disclosure relate to the field of image display technology and, in particular, to a picture displaying method and apparatus, an electronic device, a storage medium, and a computer program product.

BACKGROUND

In recent years, scientific technology and Internet technology have developed rapidly, and more and more intelligent terminal devices are emerging. People can use mobile phones, computers, displayers and other terminal devices to perform live broadcasting, watch videos and play games, etc., which greatly enriches people's lives. With the improvement of social living standards, people place increasingly higher requirements on the functional effect of these terminal devices, for example, people place increasingly higher requirements on viewing quality of a live broadcast picture, a video picture and a game picture when conducting recreational activities such as live broadcasting, video watching and game playing.

In related arts, a video picture played by a client is output by a server terminal. For example, when performing live broadcasting using a client, a user sends a live broadcast request to a server terminal which, after receiving the live broadcast request, outputs a corresponding live broadcast picture to the corresponding client, where the picture output by the server terminal has a same resolution as that of a virtual display screen of the server terminal. However, the display screens of different clients have different resolutions, and in order to ensure the quality of the picture played by a client, it is a must that a server terminal with a same resolution ratio should be matched to the client. For example, if the client has a resolution of 720×1280 and a resolution ratio of 9:16 for its display screen, the server terminal that needs to be matched to the client should also have a resolution ratio of 9:16 (for example, it can be 720×1280) for its virtual display screen. If there is no possibility to provide a server terminal with the same ratio as that of the display screen of the client, the picture played by the client may present upper and lower black edges or peripheral black edges, and even the picture will be cropped or stretchably distorted, thereby seriously impacting the picture quality.

For each client, since a server terminal with a same resolution ratio as that of the client needs to be matched, it takes significant time costs and manpower for server terminal scheduling and matching. Moreover, since one server terminal can only support a client having a same ratio of resolution, in order to ensure the quality of pictures played by clients of all resolutions, it is necessary to deploy more server terminals supporting different ratios of resolution, thereby resulting in high complexity of server terminal management and low device utilization.

SUMMARY

Embodiments of the present disclosure provide a picture displaying method and apparatus, an electronic device, a storage medium and a computer program product, to overcome the problems in the prior arts that it takes significant time costs and manpower for server terminal scheduling and matching, server terminal management is of high complexity and device utilization of a server terminal is low.

In a first aspect, an embodiment of the present disclosure provides a picture displaying method applied to a server terminal. The method includes:
   acquiring a first resolution of a display screen of a client;
   adjusting, according to the first resolution, a to-be-output picture to obtain an effective display picture, where the effective display picture is displayed at a same ratio as a ratio of the first resolution; and
   transmitting the effective display picture to the client for display.

In a second aspect, an embodiment of the present disclosure provides a picture displaying method applied to a client. The method includes:
   transmitting a first resolution of a display screen of the client to a server terminal, to enable the server terminal to adjust, according to the first resolution, a to-be-output picture to obtain an effective display picture, where the effective display picture is displayed at a same ratio as a ratio of the first resolution; and
   receiving and displaying the effective display picture transmitted by the server terminal.

In a third aspect, an embodiment of the present disclosure provides a picture displaying apparatus, including:
   an acquiring module, configured to acquire a first resolution of a display screen of a client;
   an adapting module, configured to adjust, according to the first resolution, a to-be-output picture to obtain an effective display picture, where the effective display picture is displayed at a same ratio as a ratio of the first resolution; and
   a first transmitting module, configured to transmit the effective display picture to the client for display.

In a fourth aspect, an embodiment of the present disclosure provides a picture displaying apparatus, including:
   a second transmitting module, configured to transmit a first resolution of a display screen of a client to a server terminal, to enable the server terminal to adjust, according to the first resolution, a to-be-output picture to obtain an effective display picture, where the effective display picture is displayed at a same ratio as a ratio of the first resolution; and
   a displaying module, configured to receive and display the effective display picture transmitted by the server terminal.

In a fifth aspect, an embodiment of the present disclosure provides an electronic device, including: at least one processor and a memory;
   where the memory has, stored therein, computer-executable instructions; and
   the at least one processor executes the computer-executable instructions stored in the memory, to enable the at least one processor to execute the picture displaying method described above in the first aspect and various possible designs of the first aspect as well as the second aspect and various possible designs of the second aspect.

In a sixth aspect, an embodiment of the present disclosure provides a computer-readable storage medium in which computer-executable instructions are stored, where the picture displaying method described above in the first aspect and various possible designs of the first aspect as well as the second aspect and various possible designs of the second aspect is implemented when the computer-executable instructions are executed by a processor.

In a seventh aspect, an embodiment of the present disclosure provides a computer program product, including: a computer program, where the computer program, when being executed by a processor, enables the processor to implement the picture displaying method described above in the first aspect and various possible designs of the first aspect as well as the second aspect and various possible designs of the second aspect.

In an eighth aspect, an embodiment of the present disclosure provides a computer program. The computer program, when being executed by a processor, enables the processor to implement the picture displaying method described above in the first aspect and various possible designs of the first aspect as well as the second aspect and various possible designs of the second aspect.

The embodiments of the present disclosure provide a picture displaying method and apparatus, an electronic device, a storage medium and a computer program product. According to the method, a first resolution of a display screen of a client is acquired by a server terminal; then a display ratio of a to-be-output picture is adjusted according to the first resolution of the display screen of the client, so that an effective display picture finally output by the server terminal has a same ratio as a ratio of the display screen of the client; and then the effective display picture is transmitted to the client for display. According to the method provided in the embodiments of the present disclosure, for clients of different resolutions, it is not necessary for a technician to deploy server terminals of more display ratios and match, for the clients of different resolutions, server terminals that have the same ratio of resolution. As long as the resolution of a display screen of a client is acquired by a server terminal, an effective display picture which is at the same display ratio as that of the client can be output. With an assurance that no black edge or distortion appears in a picture displayed in the client, an effect of one server terminal being capable of supporting clients of various different resolutions is achieved, thereby reducing the complexity of server terminal management, and improving the device utilization of the server terminal.

BRIEF DESCRIPTION OF DRAWINGS

In order to describe technical solutions in embodiments of the present disclosure or the existing technology more clearly, the accompanying drawings used in the description of the embodiments of the present disclosure or the existing technology will be briefly described hereunder. Apparently, the drawings in the following description are intended for some embodiments of present disclosure. For persons of ordinary skill in the art, other drawings may be obtained based on these drawings without any creative effort.

DESCRIPTION OF EMBODIMENTS

In order to make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Apparently, the described embodiments are only some embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
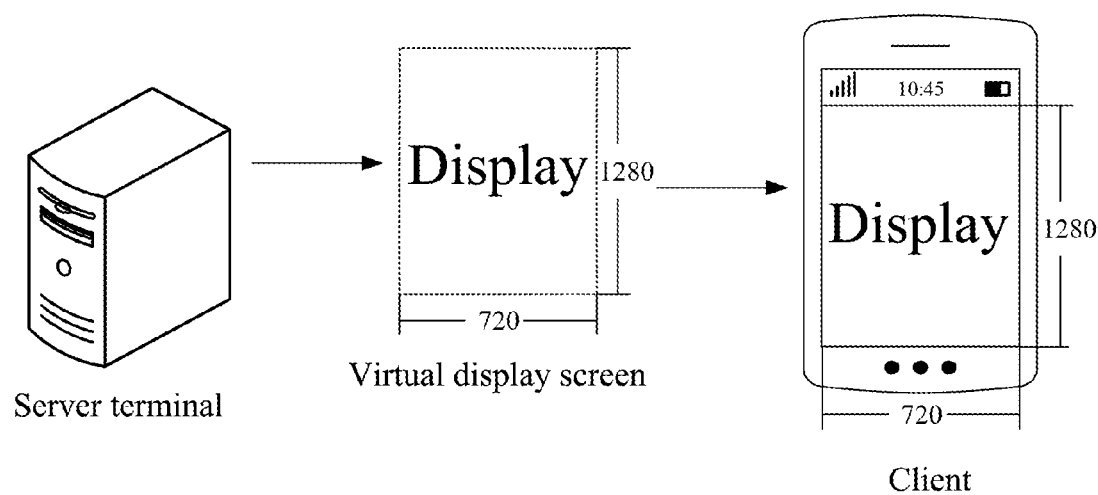
FIG. 1 is a first schematic diagram illustrating a picture adaptation result in prior arts.
Figure 2:
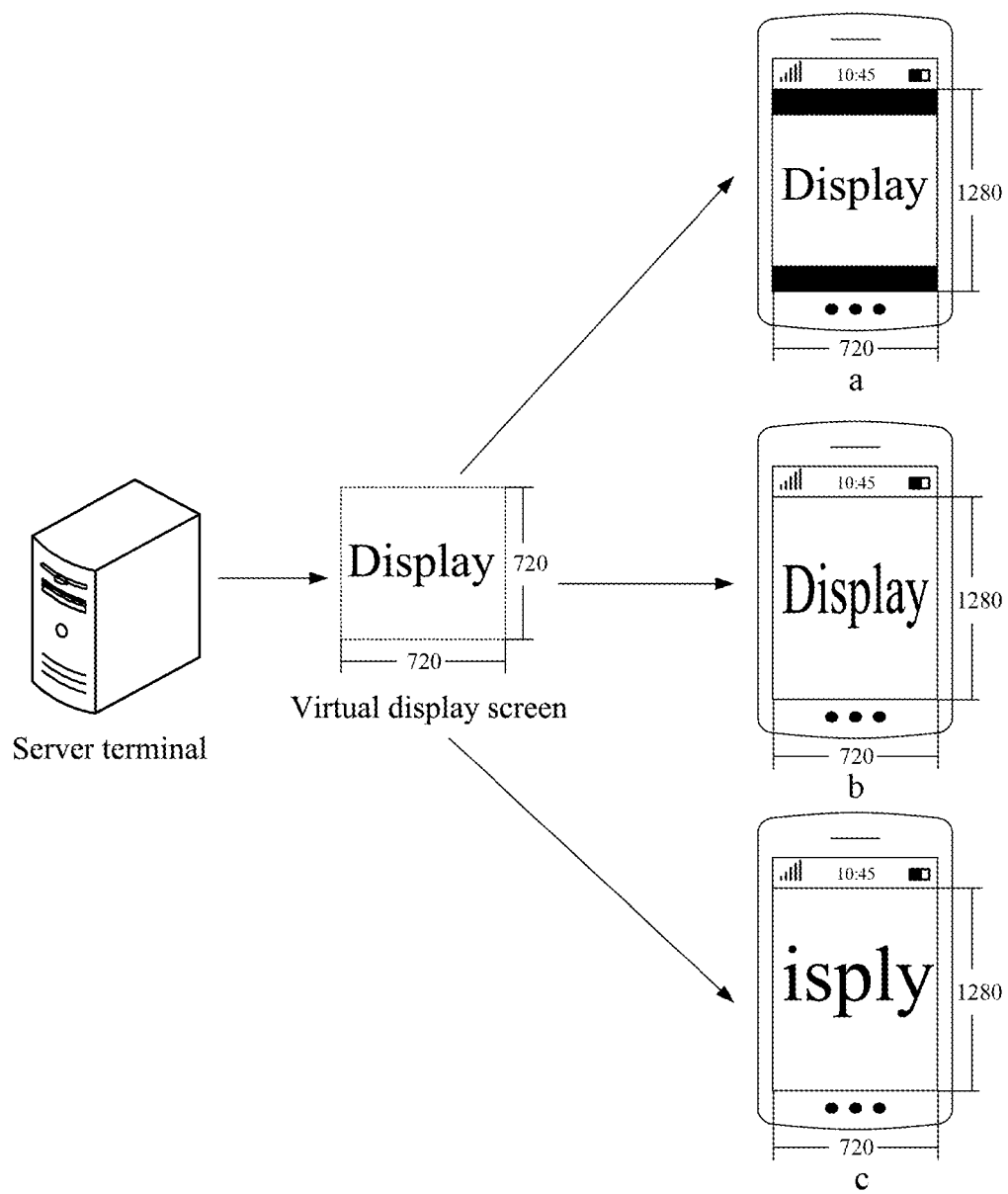
FIG. 2 is a second schematic diagram illustrating a picture adaptation result in prior arts.
Figure 3:
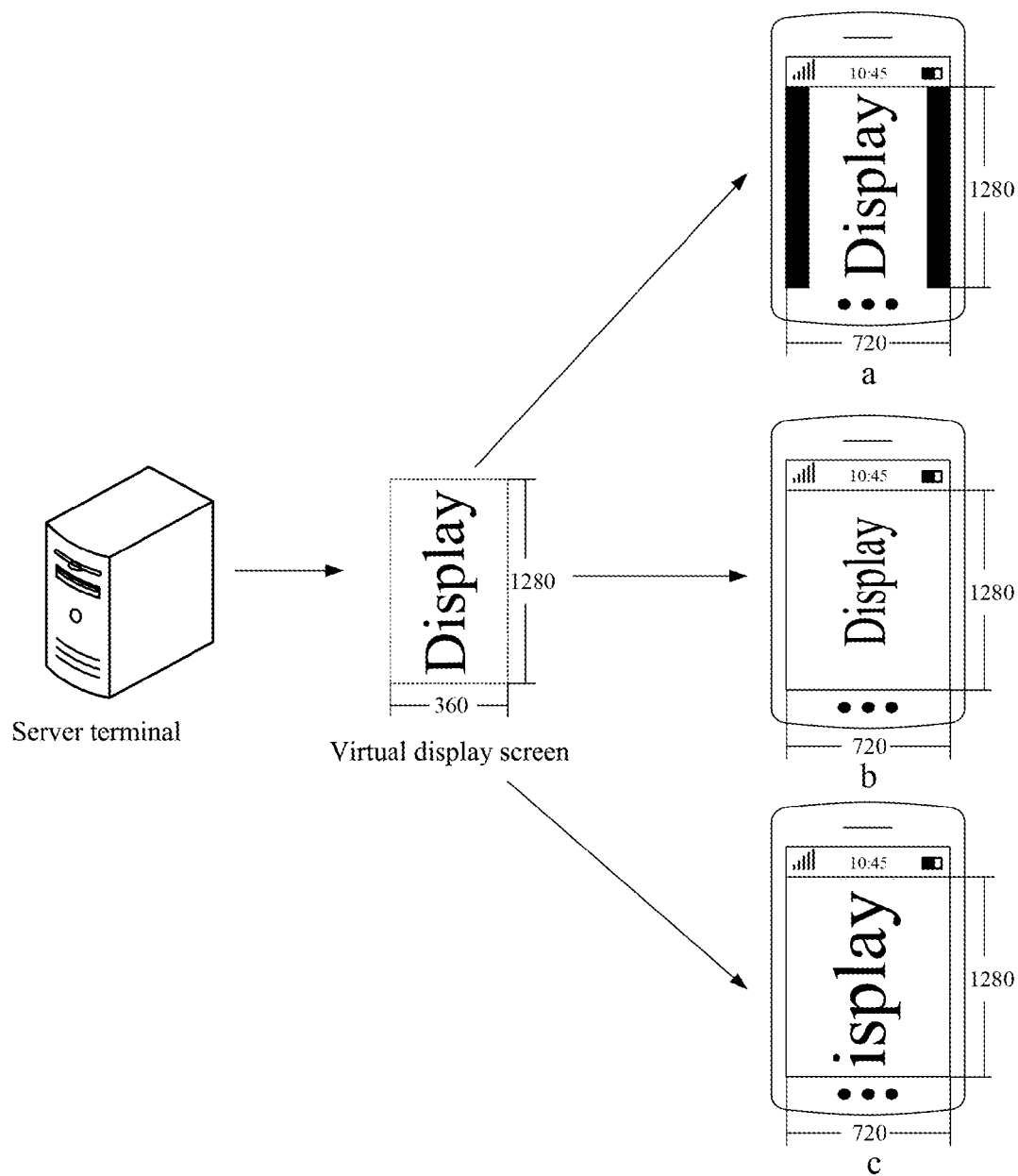
FIG. 3 is a third schematic diagram illustrating a picture adaptation result in prior arts.

In related arts, a video picture played by a client is output by a server terminal. For example, when performing live broadcasting using a client, a user sends a live broadcast request to a server terminal which, after receiving the live broadcast request, outputs a corresponding live broadcast picture to the corresponding client, where the picture output by the server terminal has a same resolution as that of a virtual display screen of the server terminal. However, the display screens of different clients have different resolutions, and in order to ensure the quality of the picture played by a client, it is a must that a server terminal with a same resolution ratio should be matched to the client. If there is no possibility to provide a server terminal with the same ratio as that of the display screen of the client, the picture played by the client may present upper and lower black edges or peripheral black edges, and even the picture will be cropped or stretchably distorted, thereby seriously impacting the picture quality. Exemplarily, as shown in FIG. 1, if the client has a resolution (horizontal pixel×vertical pixel) of 720× 1280 and a resolution ratio of 9:16 for its display screen, and the server terminal matched to the client also has a resolution ratio of 9:16 for its virtual display screen, then the display ratio of the virtual display screen of the server terminal and the ratio of the display screen of the client are the same, both are 9:16, so that the picture output by the serve (the element in the picture includes "Display" (which means two words in Chinese, i.e., 显示)) can be displayed, in full screen, in the display screen of the client. If the server terminal matched has a resolution of 720×720 for its virtual display screen while the client has a resolution of 720×1280 for its display screen, then as shown in FIG. 2, the actual display picture in the display screen of the client may present upper and lower black edges (as shown in a of FIG. 2), or the picture is stretched longitudinally so that full-screen displaying is possible on the client but the picture is stretchably distorted upwardly and downwardly (as shown in b of FIG. 2), or the picture is zoomed in at the same scale so that full-screen displaying is possible on the client but the picture is cropped leftwardly and rightwardly (as shown in c of FIG. 2). If the server terminal matched has a resolution of 360×1280 for its virtual display screen and the client has a resolution of 720×1280 for its display screen, then as shown in FIG. 3, the actual display picture in the display screen of the client may present left and right black edges (as shown in a of FIG. 3), or the picture is stretched leftwardly and rightwardly so that full-screen displaying is possible on the client but the picture is stretchably distorted in left and right directions (as shown in b of FIG. 3), or the picture is zoomed in at the same scale so that full-screen displaying is possible on the display screen of the client but the picture is cropped upwardly and downwardly (as shown in c of FIG. 3).

For each client, since a server terminal with a same resolution ratio as that of the client needs to be matched, it takes significant time costs and manpower for server terminal scheduling and matching. Moreover, since one server terminal can only support a client having a same ratio of resolution, in order to ensure the quality of pictures played by clients of all resolutions, it is necessary to deploy more server terminals supporting different ratios of resolution, thereby resulting in high complexity of server terminal management and low device utilization.

In light of these defects, the technical conception of the embodiments of the present disclosure mainly includes: providing a multi-resolution picture adaptation method. A to-be-output picture is adjusted by a server terminal according to a resolution of a display screen of a client so that an effective display picture obtained after the adjustment has a same ratio as a ratio of resolution of the display screen of the client; and then the effective display picture is transmitted to the client for display. For clients of different resolutions, it is not necessary for a technician to deploy server terminals of more display ratios and match, for the clients of different resolutions, server terminals that have the same ratio of resolution. As long as the resolution of a display screen of a client is acquired by a server terminal, an effective display picture which is at the same display ratio as that of the client can be output. With an assurance that no black edge or distortion appears in a picture displayed in the client, an effect of one server terminal being capable of supporting clients of various different resolutions is achieved, thereby reducing the complexity of server terminal management, and improving the device utilization of the server terminal. Moreover, after adjusting the to-be-output picture according to the resolution of the display screen of the client, the server terminal, instead of transmitting the adjusted picture directly to the client for display, may firstly partition an effective display area having the same ratio as the display ratio of the display screen of the client out of the virtual display screen of the server terminal according to the resolution of the display screen of the client, and project the adjusted to-be-output picture into the effective display area; and then the server terminal transmits the entire display picture of its virtual display screen to the client, that is, the picture proportion of the entire display picture transmitted to the client is the proportion of the virtual display screen of the server terminal; and the client, after receiving the entire display picture, extracts and displays the effective display picture within the effective display area of the entire display picture. In this way, what the server terminal codes and transmits has always been of the size of the virtual display screen of the server terminal, for clients of different resolutions, the entire display pictures transmitted by the server terminal have a consistent resolution, and only the effective display pictures in the effective display areas respectively corresponding to the clients of different resolutions have inconsistent resolutions. This is conducive to continuous streaming by the server terminal, and there is no need to reconfigure a decoder after the client resolution changes.

Figure 4:
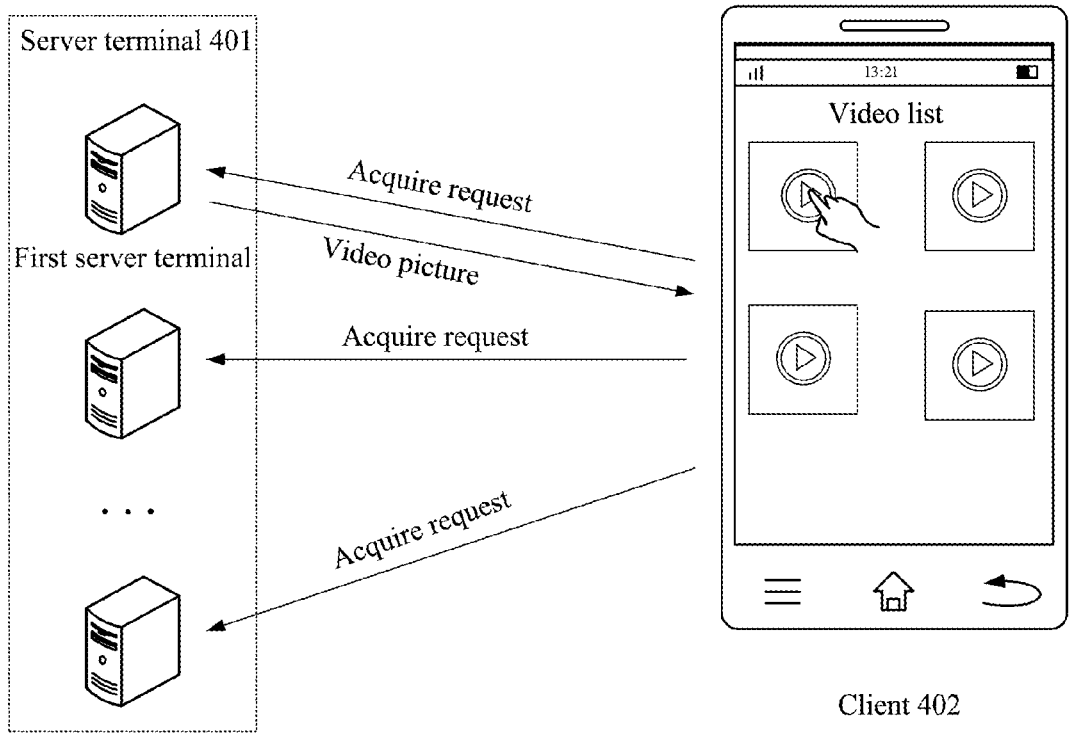
FIG. 4 is a first diagram illustrating an application scenario of a picture displaying method according to an embodiment of the present disclosure.

FIG. 4 is a first diagram illustrating an application scenario of a picture displaying method according to an embodiment of the present disclosure.

As shown in FIG. 4, the application scenario provided in the embodiment of the present disclosure has a basic architecture mainly including: at least one server terminal 401 and a client 402. A user clicks a corresponding playing control when performing live broadcasting or watching a video with the client; and then the client transmits an acquiring request to the at least one server terminal; the at least one server terminal, after receiving the acquiring request transmitted by the client, schedules from the at least one server terminal a server terminal having the same resolution ratio as that of the display screen of the client. Assuming that a virtual display screen of a first server terminal has the same resolution ratio as that of the display screen of the client, then the first server terminal outputs a corresponding live broadcast or video picture to the client; if none of the at least one server terminal has a resolution ratio consistent with that of the client 402, a server terminal that is currently in an idle state is selected therefrom to output the picture requested by the client.

Figure 5:
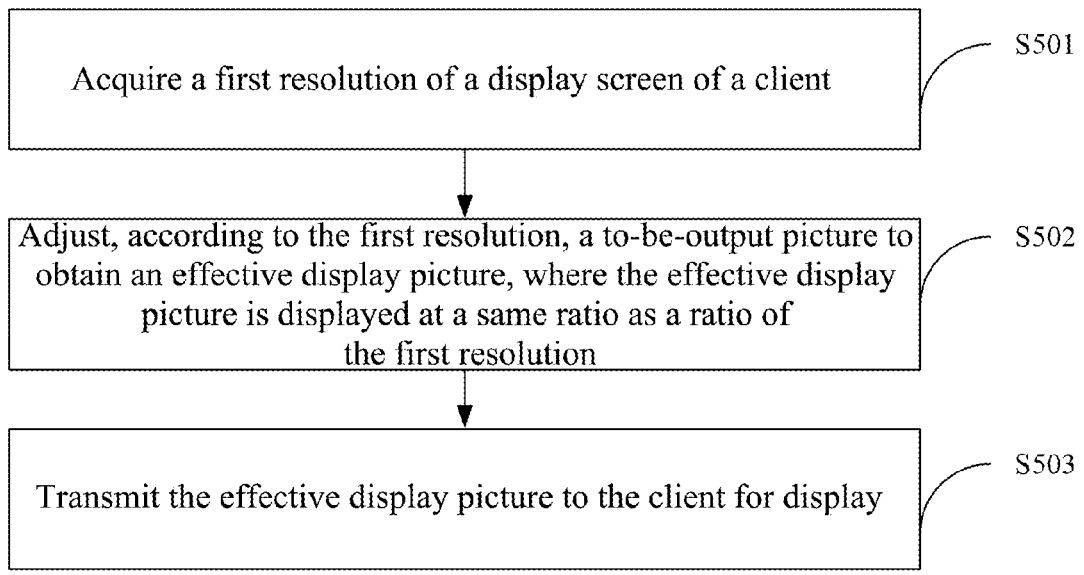
FIG. 5 is a first schematic flowchart illustrating a picture displaying method according to an embodiment of the present disclosure.

FIG. 5 is a first schematic flowchart illustrating a picture displaying method according to an embodiment of the present disclosure. The execution subject of the method provided in the embodiment of the present disclosure is a server terminal.

As shown in FIG. 5, the method provided in the embodiment of the present disclosure may include the following steps.

S501, acquire a first resolution of a display screen of a client.

Specifically, a user clicks a corresponding playing control when performing live broadcasting or watching a video with the client; and then the client transmits a scheduling request to at least one server terminal, where the scheduling request carries the first resolution of the display screen of the client; and the at least one server terminal, after receiving the scheduling request transmitted by the client, schedules a server terminal that is currently in an idle state, where the server terminal parses the scheduling request to obtain the first resolution of the display screen of the client.

In one possible embodiment, if each of the at least one server terminal is currently in a non-idle state, each server terminal adds the scheduling request to a waiting queue; and when one of the at least one server terminal completes a task, it handles the scheduling request. It should be noted that one server terminal, when starting to handle the scheduling request, will transmit a second indication information to other server terminals to give an indication to other server terminals to clear the scheduling request from their waiting queues, thereby protecting multiple server terminals from processing repetitions of the scheduling request.

S502, adjust, according to the first resolution, a to-be-output picture to obtain an effective display picture, where the effective display picture is displayed at a same ratio as a ratio of the first resolution.

The ratio of the first resolution is a proportion of horizontal pixels to vertical pixels, and the to-be-output picture is an image that is subject to streaming from the server terminal to the client.

Specifically, the server terminal determines an aspect ratio of the display screen of the client according to the first resolution, that is, the proportion of horizontal pixels to vertical pixels of the first resolution, and rearranges the to-be-output picture according to the aspect ratio of the display screen of the client, so that an aspect ratio of the adjusted to-be-output picture is equal to the aspect ratio of the display screen of the client.

Exemplarily, assuming that the server terminal has a resolution of 720×1440 for its virtual display screen, the server terminal, after receiving the first resolution of the display screen of the client, determines that the aspect ratio of the display screen of the client is 9:16; if the prior arts are used, the server terminal will output a picture having a resolution of 720×1440 (an aspect ratio of 1:2) to the client; since the aspect ratio of the display screen of the client is not the same as the aspect ratio of the picture output by the server terminal, the picture may present black edges or the picture is cropped or stretchably distorted when being displayed on the client. However, in the embodiment of the present disclosure, the server terminal will automatically rearrange and adjust elements in the to-be-output picture, so that the adjusted to-be-output picture (i.e., the effective display picture) has a resolution of 720×1280 and the adjusted to-be-output picture also has an aspect ratio of 9:16.

S503, transmit the effective display picture to the client for display.

Specifically, since in the previous step the server terminal adjusts the aspect ratio of the to-be-output picture to be consistent with the aspect ratio of the display screen of the client so that the aspect ratio of the effective display picture received by the client is the same as the aspect ratio of the display screen of the client, the client could display the effective display picture normally in full screen in its display screen if only there would be tiled displaying, there is no need to perform stretching, cropping and other operations on the picture, nor would black edges appear, thereby guaranteeing the quality of the picture.

In the embodiments of the present disclosure, for clients of different resolutions, it is not necessary for a technician to deploy server terminals of more display ratios and match, for the clients of different resolutions, server terminals that have the same ratio of resolution. As long as the resolution of a display screen of a client is acquired by a server terminal, an effective display picture which is at the same display ratio as that of the client can be output. With an assurance that no black edge or distortion appears in a picture displayed in the client, an effect of one server terminal being capable of supporting clients of various different resolutions is achieved, thereby reducing the complexity of server terminal management, and improving the device utilization of the server terminal.

Figure 6:
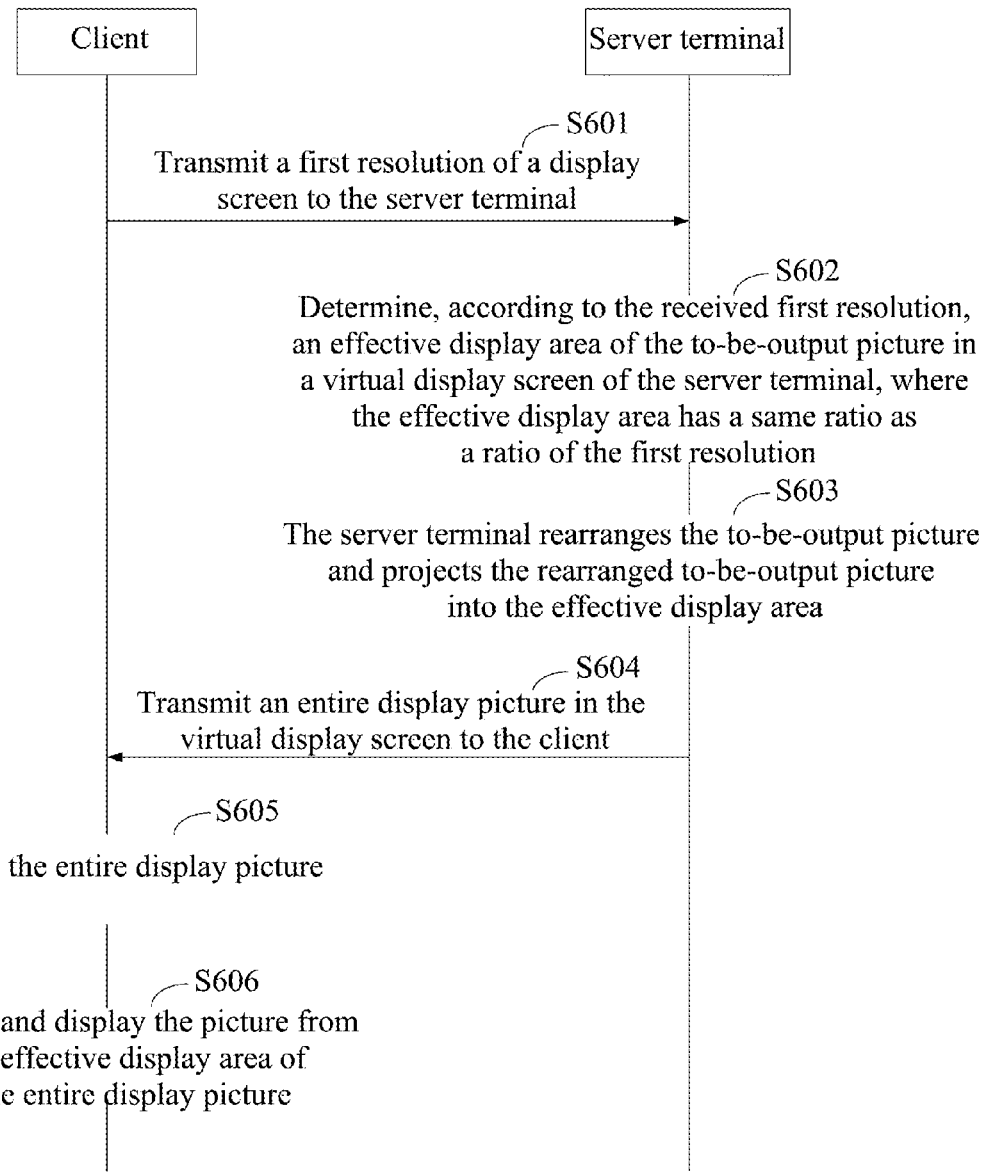
FIG. 6 is a second schematic flowchart illustrating a picture displaying method according to an embodiment of the present disclosure.

FIG. 6 is a second schematic flowchart illustrating a picture displaying method according to an embodiment of the present disclosure. Interaction between a server terminal and a client is taken as an example in the embodiment of the present disclosure. The picture displaying method is further described in detail on the basis of the embodiment shown in FIG. 5 in conjunction with embodiments.

As shown in FIG. 6, the method provided in the embodiment of the present disclosure may include the following steps.

S601, the client transmits a first resolution of a display screen to the server terminal.

In some embodiments, a user, when performing live broadcasting or watching a video with a mobile phone, a tablet, a displayer and other clients, clicks a corresponding live-broadcast control or video playing control on the display screen in a touch manner or selects a video to be played by means of a remote control, then the client transmits a scheduling request carrying a resolution of the display screen of the client to the server terminal in response to the operation input by the user, and the server terminal can parse the resolution of the display screen of the client in the received scheduling request.

In one possible case according to an embodiment of the present disclosure, the client will simultaneously transmit the scheduling request to multiple server terminal devices, and a server terminal of the multiple server terminal devices that is currently in an idle state will be scheduled to output a corresponding picture for the client.

Figure 8:
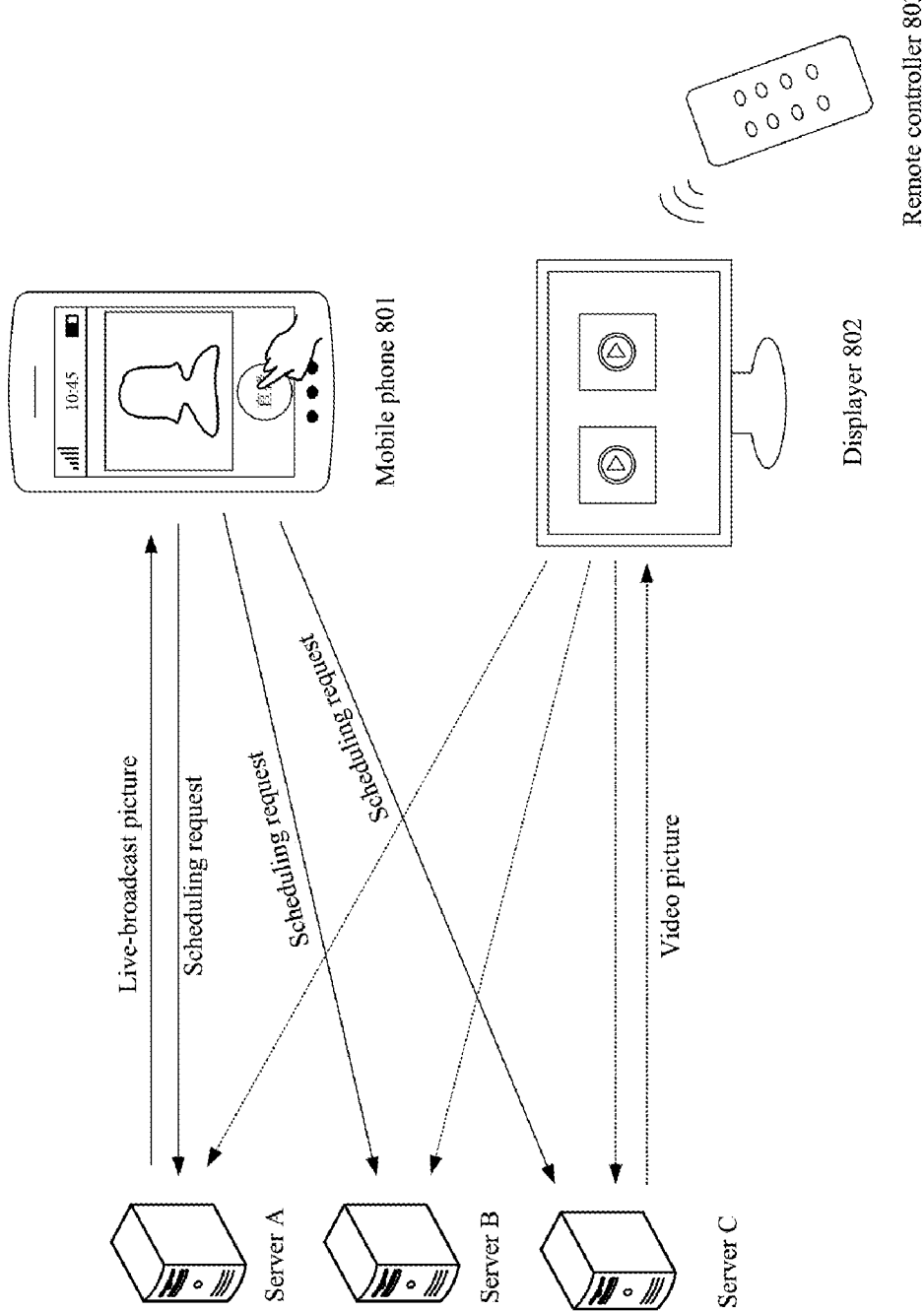
FIG. 8 is a second diagram illustrating an application scenario of a picture displaying method according to an embodiment of the present disclosure.

Exemplarily, as shown in FIG. 8, a background server terminal includes three devices: server A, server B and server C. If a user uses a mobile phone 801 for live broadcasting, then the mobile phone transmits a scheduling request carrying the resolution of the display screen of the mobile phone to these three servers when the user clicks a go-live control on the screen of the mobile phone; if server A is currently in an idle state, server A will output a live-broadcast picture to the mobile phone after the scheduling request transmitted by the mobile phone is received by server A, and meanwhile server A will transmit the second indication information to the remaining two servers B and C; and servers B and C will not process the scheduling request transmitted by the mobile phone any longer after their reception of the second indication information, thereby protecting the multiple servers from processing repetitions of the scheduling request. At this point, if a user uses a displayer 802 to watch TV, then the user can use a remote controller 803 to select a video to play; after confirmation of the selection, the displayer 802 will transmit a scheduling request carrying the resolution of the displayer to servers A, B and C, then one of servers B and C will be selected to output a video picture to the displayer 802 since server A is now outputting the live-broadcast picture to the mobile phone 801.

It should be noted that if each of the three servers is currently in a non-idle state, each server will add the scheduling request to its waiting queue, and one of the servers that completes a task will process the scheduling request.

S602, the server terminal determines, according to the received first resolution, an effective display area of the to-be-output picture in a virtual display screen of the server terminal, where the effective display area has a same ratio as a ratio of the first resolution.

Figure 7:
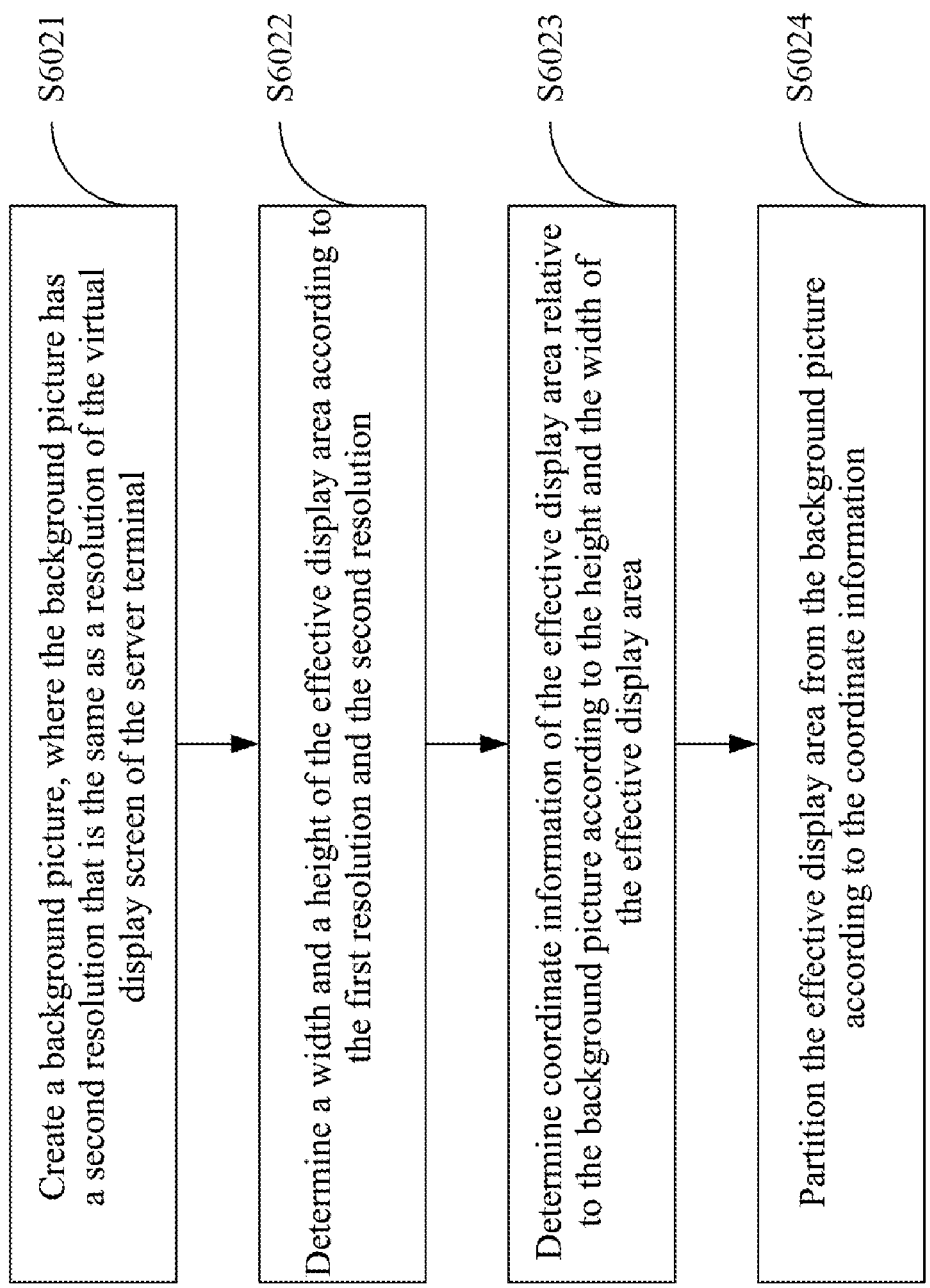
FIG. 7 is a third schematic flowchart illustrating a picture displaying method according to an embodiment of the present disclosure.

In one possible embodiment, with reference to FIG. 7, the method according to which the server terminal determines, according to the received first resolution, the effective display area of the to-be-output picture in the virtual display screen of the server terminal may include the following steps.

S6021, create a background picture, where the background picture has a second resolution that is the same as a resolution of the virtual display screen of the server terminal.

Specifically, the background picture is created according to the resolution of the virtual display screen of the server terminal, and the resolution of the created background picture is the same as the physical resolution of the virtual display screen.

Figure 9:
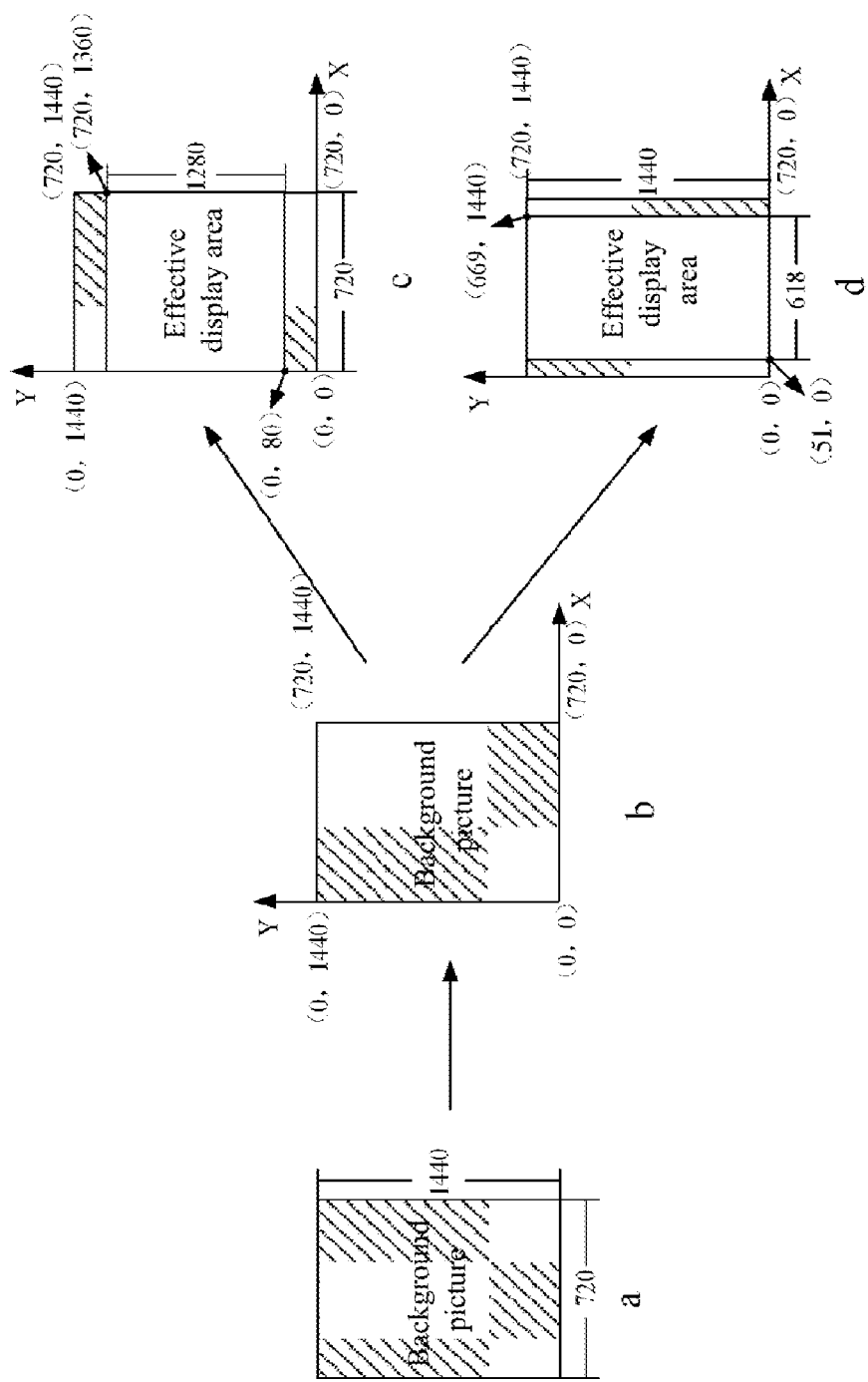
FIG. 9 is a third diagram illustrating an application scenario of a picture displaying method according to an embodiment of the present disclosure.

Exemplarily, assuming that the server terminal has a resolution of 720×1440 for its virtual display screen, the created background picture also has a size of 720×1440, as shown in a of FIG. 9.

S6022, determine a width and a height of the effective display area according to the first resolution and the second resolution.

In this step, the width and the height of the effective display area are determined according to a first horizontal pixel (width) and a first vertical pixel (height) of the display screen of the client as well as a second horizontal pixel and a second vertical pixel of the created background picture, so that the aspect ratio of the effective display area is consistent with the aspect ratio of the display screen of the client.

Specifically, the ratio (a ratio value) of the height to the width of the display screen of the client is obtained by determining a ratio value of a first vertical pixel to a first horizontal pixel of the first resolution. If it is determined that a second vertical pixel of the second resolution (that is, the height of the background picture) is greater than a product of a second horizontal pixel of the second resolution (that is, the width of the background picture) and the ratio value, the second horizontal pixel is determined as the width of the effective display area, and the product of the second horizontal pixel and the ratio value is determined as the height of the effective display area; and if it is determined that the second vertical pixel of the second resolution is less than or equal to the product of the second horizontal pixel of the second resolution and the ratio value, the second vertical pixel is determined as the height of the effective display area, and the second vertical pixel is divided by the ratio value to determine a division result as the width of the effective display area.

S6023, determine coordinate information of the effective display area relative to the background picture according to the height and the width of the effective display area.

In this step, as shown in a of FIG. 9, the coordinate system is established with the lower left corner of the background picture as the coordinate origin, and if the server terminal has a resolution of 720×1440 for its virtual display screen, the coordinates of each vertex of the background picture in the coordinate system are shown in b of FIG. 9.

Specifically, an abscissa and an ordinate of a first vertex of the effective display area are determined, where the abscissa of the first vertex is half of a difference between the second horizontal pixel and the width of the effective display area, and the ordinate of the first vertex is half of a difference between the second vertical pixel and the height of the effective display area.

Further, an abscissa and an ordinate of a second vertex of the effective display area are determined, where the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

S6024, partition the effective display area from the background picture according to the coordinate information.

Specifically, after coordinate information of two diagonal vertices of the effective display picture is determined, the effective display area is partitioned from the background picture.

In order to better understand the process of partitioning the effective display area, the process of determining the coordinate information of the effective display area will be described hereunder with the following codes:

```
1.   float displayAspect = sourceHeight / sourceWidth;
2.   if (videoHeight > videoWidth * displayAspect) {
3.       outWidth = videoWidth;
4.       outHeight = videoWidth * displayAspect;
5.   } else {
6.       outHeight = videoHeight;
7.       outWidth = videoHeight / displayAspect;
8.   }
9.   offX = (videoWidth − outWidth) / 2;
10.  offY = (videoHeight − outHeight) / 2;
```

After calculation, the first vertex of the effective display area has a coordinate of (offX, offY), and the second vertex has a coordinates of (offX+outWidth, offY+outHeight).

Among them, displayAspect in the first line of codes represents a ratio value of the height (the first vertical pixel) to the width (the first horizontal pixel) of the display screen of the client, videoHeight represents the height (that is, the second vertical pixel) of the virtual display screen of the server terminal, videoWidth (that is, the second horizontal pixel) represents the width of the virtual display screen of the server terminal, outHeight represents the height of the effective display area, and outWidth represents the width of the effective display area.

It should be noted that the effective display area is centered in the background picture when partitioning the effective display area, in order that it is convenient for the client to extract, from the background picture, an effective display picture in the effective display area.

Exemplarily, if the server terminal has a resolution of 720×1440 for its virtual display screen (that is, width×height of the created background picture) and the client has a resolution of 720×1280 for its display screen, it is firstly determined that the ratio value of the height to the width of the display screen of the client is 1280:720, that is, 16/9; then, the product of the width of the background picture and the ratio value is 720*16/9=1280, which is less than the height (i.e., 1440) of the background picture; then the width of the effective display area is equal to the width (i.e., 720) of the background picture, and the height of the effective display area is equal to 1280, that is, the resolution of the effective display area is 720×1280. After the width and the height of the effective display area are obtained, the coordinates of the two diagonal vertices of the effective display area are determined by taking the background picture as the coordinate system, where the abscissa of the first vertex is half of a difference between the width of the background picture and the width of the effective display area, that is, (720−720)/2=0, and the ordinate of the first vertex is half of a difference between the height of the background picture and the height of the effective display area, that is, (1440−1280)/2=80, then the coordinate of the first vertex is (0,80); the abscissa of the second vertex which is a diagonal vertex to the first vertex is a sum of the abscissa of the first vertex and the width of the effective display area, that is, 0+720=720, and the ordinate of the second vertex is a sum of the ordinate of the first vertex and the height of the effective display area, that is, 80+1280=1360, then the coordinate of the second vertex is (720,1360), and the effective display area is partitioned from the background picture in accordance with the coordinates of the first vertex and the second vertex of the effective display area, as shown in c of FIG. 9.

Exemplarily, if the server terminal has a resolution of 720×1440 for its virtual display screen (that is, width×height of the created background picture) and the client has a resolution of 720×1680 for its display screen, it is determined that the ratio value of the height to the width of the display screen of the client is 1680:720, that is, 21/9; then, the product of the width of the background picture and the ratio value is 720*21/9=1680, which is greater than the height (i.e., 1440) of the background picture; then the height of the effective display area is equal to the height (i.e., 1440) of the background picture, and the width of the effective display area is 1440/(21/9), approximately equal to 618 after rounding up, that is, the resolution of the effective display area is 618×1440. After the width and the height of the effective display area are obtained, the coordinates of the two diagonal vertices of the effective display area are determined by taking the background picture as the coordinate system, where the abscissa of the first vertex is half of a difference between the width of the background picture and the width of the effective display area, that is, (720−618)/2=51, and the ordinate of the first vertex is half of a difference between the height of the background picture and the height of the effective display area, that is, (1440−1440)/2=0, then the coordinate of the first vertex is (51,0); the abscissa of the second vertex which is a diagonal vertex to the first vertex is a sum of the abscissa of the first vertex and the width of the effective display area, that is, 51+618=669, and the ordinate of the second vertex is a sum of the ordinate of the first vertex and the height of the effective display area, that is, 0+1440=1440, then the coordinate of the second vertex is (669,1440), and the effective display area is partitioned from the background picture in accordance with the coordinates of the first vertex and the second vertex of the effective display area, as shown in d of FIG. 9.

S603, the server terminal rearranges the to-be-output picture and projects the rearranged to-be-output picture into the effective display area.

Specifically, after the background picture is created and the effective display area is partitioned from the background picture, it is necessary to rearrange the to-be-output picture, that is, adjusting a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area, and then projecting the adjusted to-be-output picture into the effective display area from the background picture.

In one possible embodiment, firstly, the technicians needs to create a background picture having a resolution consistent with the resolution of the virtual display screen of the server terminal, and corresponding codes are IBinder createDisplay (String name, boolean secure); after the background picture is created, set an effective display area in the background picture according to the previously determined coordinate information of the effective display area, and corresponding codes are Transaction setDisplayProjection (IBinder displayToken, int orientation, Rect layerStackRect, Rect displayRect), where Rect represents description of an area, with horizontal and vertical coordinates of a start point as well as a width and a height corresponding to the set area, that is, x, y, width and height; layerStackRect is regional description of the background picture, for example, the resolution of the virtual display screen of the server terminal is 720×1440, then the corresponding regional description of the background picture is (x=0, y=0, width=720, height=1440); for displayRect, if the width and the height of the effective display area are determined to be 720×1280, then it can be known, from the above calculation of the coordinate of the first vertex of the effective display area, that the effective display area is described as (x=0, y=80, width=720, height=1280), then the server terminal rearranges the to-be-output picture and projected it into the effective display area according to the effective display area set by the technicians, and since the scale of the partitioned effective display area is the same that of the display screen of the client, the server terminal directly arranges the to-be-output picture into the effective display picture having the same scale as that of the display screen of the client, thus there is no need to performing stretching, cropping and other operations on the picture.

S604, the server terminal transmits an entire display picture in its virtual display screen to the client.

Specifically, the entire display picture in the virtual display screen of the server terminal is the created background picture, and the effective display area is set in the background picture, and the picture displayed in the effective display area is the effective display picture having the same scale as that of the display screen of the client. That is, for clients of different resolutions, the picture transmitted by the server terminal to the clients is always a background picture having the same size as that of the virtual display screen of the server terminal, but the sole inconsistency lies in the effective display picture within the effective display area set in the background picture, and the effective display area will be adjusted according to the resolution of the client.

Figure 10:
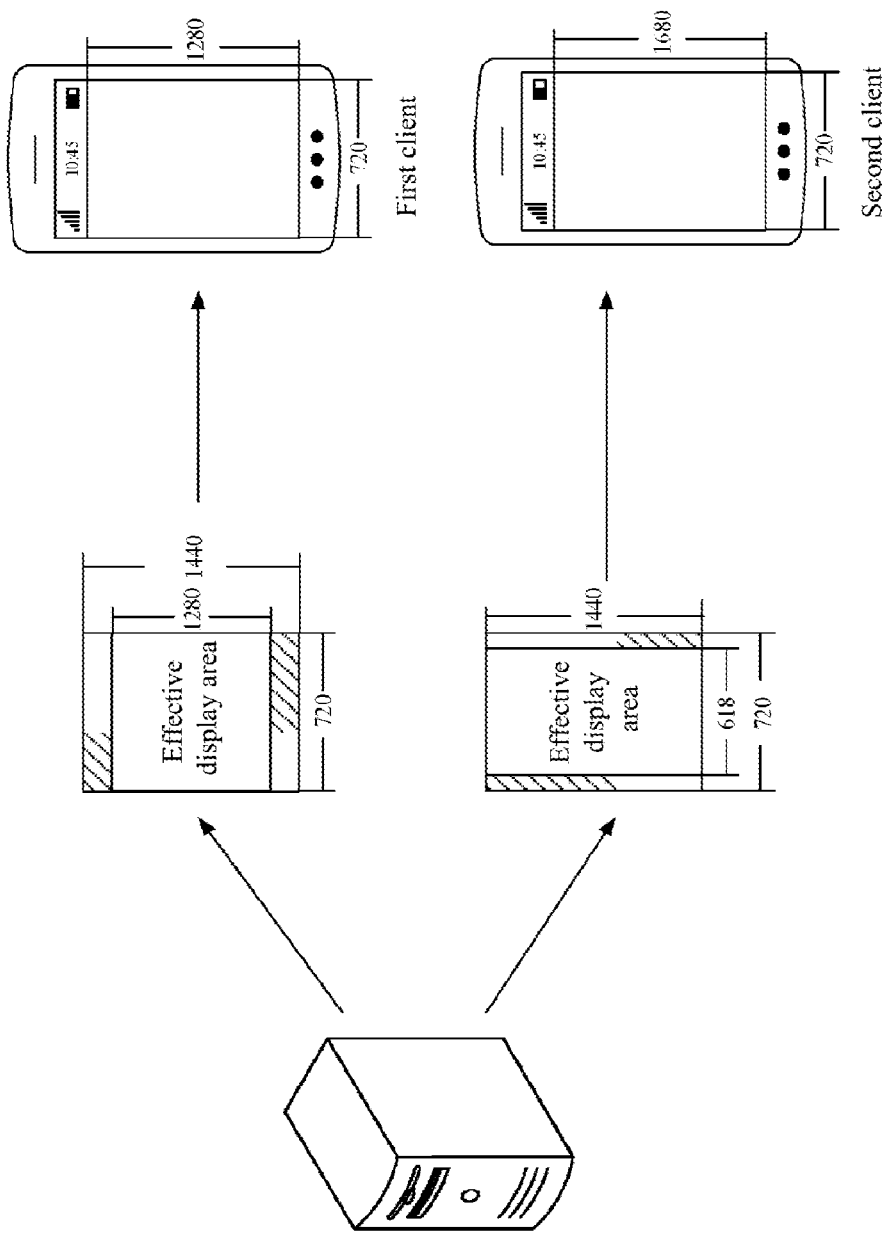
FIG. 10 is a fourth diagram illustrating an application scenario of a picture displaying method according to an embodiment of the present disclosure.

Exemplarily, as shown in FIG. 10, the server terminal has a resolution of 720×1440 for its virtual display screen, the first client has a resolution of 720×1280 for its display screen, and the second client has a resolution of 720×1680 for its display screen, then the size of the background picture transmitted by the server terminal to the first client is the same as that of the background picture transmitted by the server terminal to the second client, both at 720×1440, but the sole inconsistency lies in the effective display picture within the background picture transmitted to the two clients. The effective display picture in the background picture transmitted to the first client is 720×1280, and the effective display picture in the background picture transmitted to the second client is 618×1440.

S605, the client receives the entire display picture.

S606, the client extracts and displays the picture from the effective display area of the entire display picture.

Figure 11:
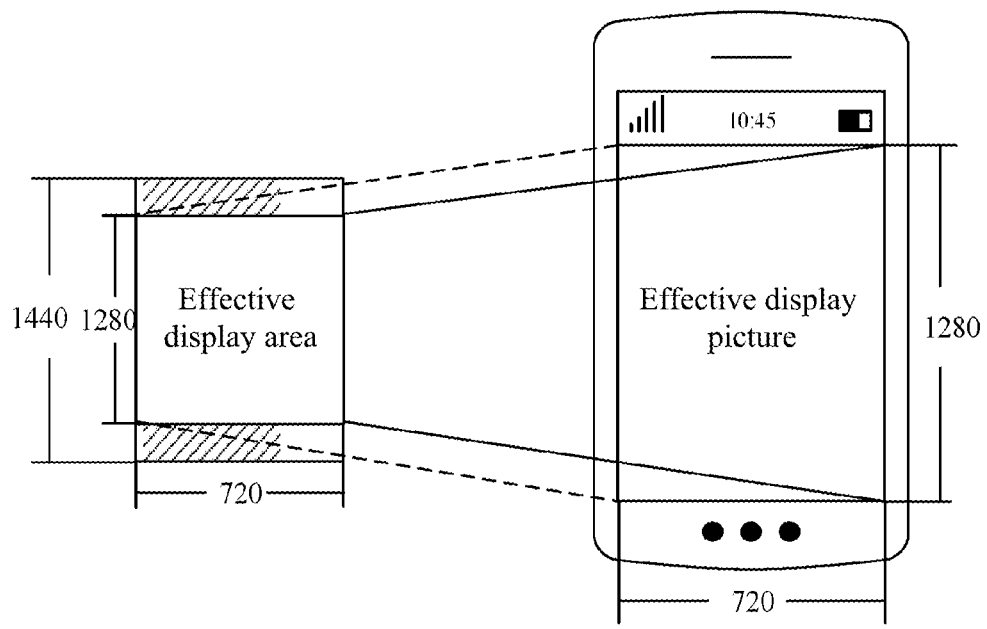
FIG. 11 is a fifth diagram illustrating an application scenario of a picture displaying method according to an embodiment of the present disclosure.

Specifically, after the entire display picture (that is, the background picture projected with the effective display picture) transmitted by the server terminal in its virtual display screen is received by the client, the client will automatically extract the effective display picture within the effective display area since the proportion of the effective display area in the background picture is the same as that of the display screen of the client; moreover, since the proportion of the extracted effective display picture is the same as that of the display screen of the client, as shown in FIG. 11, the client could normally display the extracted effective display picture in its display screen if only there would be tiled displaying, there is no need to perform stretching, cropping and other operations on the picture, thereby guaranteeing the quality of the picture displayed by the client.

In the embodiments of the present disclosure, for clients of different resolutions, it is not necessary for a technician to deploy server terminals of more display ratios and match, for the clients of different resolutions, server terminals that have the same ratio of resolution. As long as the resolution of a display screen of a client is acquired by a server terminal, an effective display picture which is at the same display ratio as that of the client can be output. With an assurance that no black edge or distortion appears in a picture displayed in the client, an effect of one server terminal being capable of supporting clients of various different resolutions is achieved, thereby reducing the complexity of server terminal management, and improving the device utilization of the server terminal. Further, since the background picture with the same size as that of the virtual display screen of the server terminal is created, the effective display area is set in the background picture and the to-be-output picture is rearranged and projected into the effective display area, for clients of different resolutions, the pictures coded and transmitted by the same server always has the same size as the size of the virtual display screen. This is conducive to continuous streaming by the server terminal, and there is no need to reconfigure a decoder after the client resolution changes.

Figure 12:
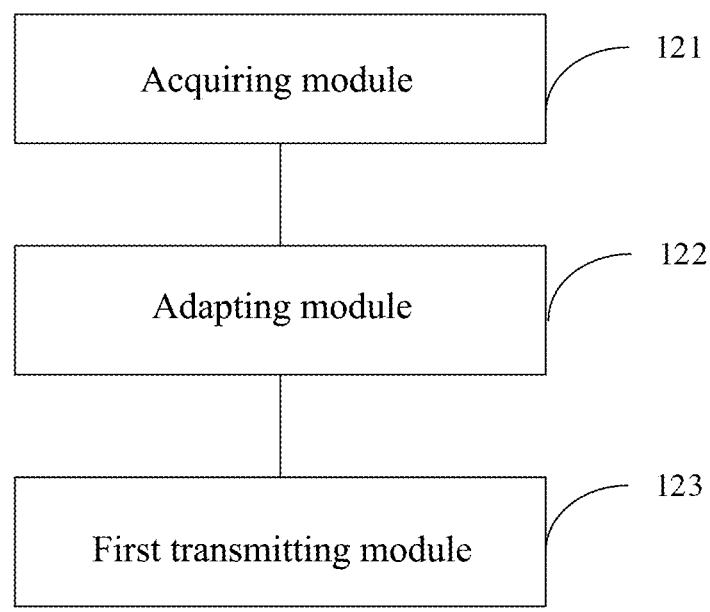
FIG. 12 is a first schematic structural diagram illustrating a picture displaying apparatus according to an embodiment of the present disclosure.

FIG. 12 is a first schematic structural diagram illustrating a picture displaying apparatus according to an embodiment of the present disclosure.

As shown in FIG. 12, the apparatus provided in the embodiment of the present disclosure includes an acquiring module 121, an adapting module 122 and a first transmitting module 123; among them, the acquiring module 121 is configured to acquire a first resolution of a display screen of a client; the adapting module 122 is configured to adjust, according to the first resolution, a to-be-output picture to obtain an effective display picture, where the effective display picture is displayed at a same ratio as a ratio of the first resolution; and the first transmitting module 123 is configured to transmit the effective display picture to the client for display.

Figure 13:
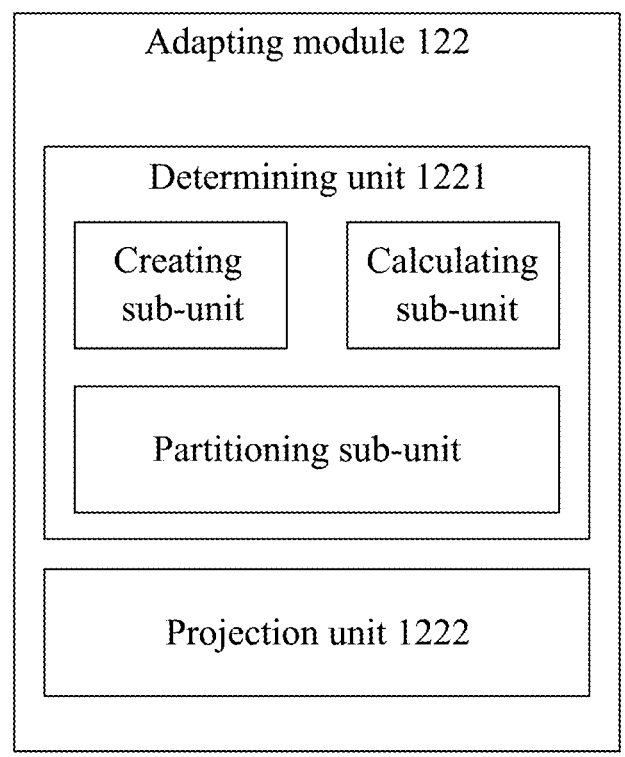
FIG. 13 is a schematic structural diagram illustrating an adapting module of a picture displaying apparatus according to an embodiment of the present disclosure.

Further, as shown in FIG. 13, the adapting module includes:
a determining unit 1221, configured to determine, according to the first resolution, an effective display area of the to-be-output picture in a virtual display screen of a server terminal, where the effective display area has a same ratio as a ratio of the first resolution; and
a projection unit 1222, configured to rearrange the to-be-output picture and project the rearranged to-be-output picture into the effective display area, to obtain the effective display picture.

Further, the determining unit includes:
a creating sub-unit, configured to create a background picture, where the background picture has a second resolution that is the same as a resolution of the virtual display screen of the server terminal;
a calculating sub-unit, configured to determine a width and a height of the effective display area according to the first resolution and the second resolution;
the calculating sub-unit is further configured to determine coordinate information of the effective display area relative to the background picture according to the height and the width of the effective display area; and
a partitioning sub-unit, configured to partition the effective display area from the background picture according to the coordinate information.

Further, the calculating sub-unit is specifically configured to:
determine a ratio value of a first vertical pixel to a first horizontal pixel of the first resolution;
if it is determined that a second vertical pixel of the second resolution is greater than a product of a second horizontal pixel of the second resolution and the ratio value, determine the second horizontal pixel as the width of the effective display area, and determine the product of the second horizontal pixel and the ratio value as the height of the effective display area; and
if it is determined that the second vertical pixel of the second resolution is less than or equal to the product of the second horizontal pixel of the second resolution and the ratio value, determine the second vertical pixel as the height of the effective display area, and divide the second vertical pixel by the ratio value to determine a division result as the width of the effective display area.

Further, the calculating sub-unit is specifically configured to:
determine an abscissa and an ordinate of a first vertex of the effective display area, where the abscissa of the first vertex is half of a difference between the second horizontal pixel and the width of the effective display area, and the ordinate of the first vertex is half of a difference between the second vertical pixel and the height of the effective display area; and
determine an abscissa and an ordinate of a second vertex of the effective display area, where the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

Further, the projection unit is specifically configured to:
adjust a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area; and
project the adjusted to-be-output picture into the effective display area from the background picture.

Further, the first transmitting module is specifically configured to:
transmit the projected background picture to the client, to enable the client to extract and display the effective display picture from the effective display area of the background picture.

Further, the acquiring module is specifically configured to: receive a device scheduling request transmitted by the client, where the device scheduling request is used to schedule an idle server terminal, and the device scheduling request carries the first resolution of the display screen of the client; and when it is determined that the idle server terminal requested by the client for scheduling is a server terminal itself, parse the device scheduling request to obtain the first resolution of the display screen of the client.

The picture displaying apparatus provided in the embodiment of the present disclosure can be used to implement the technical solution in the foregoing method embodiments, and is implemented using the similar principles and produces the similar technical effects; detailed description will be omitted in the embodiment of the present disclosure herein.

Figure 14:
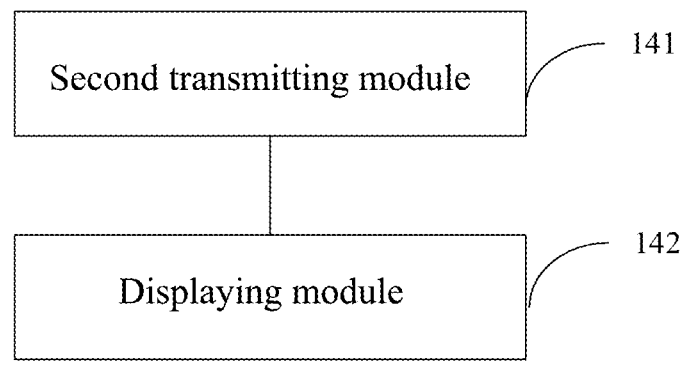
FIG. 14 is a second schematic structural diagram illustrating a picture displaying apparatus according to an embodiment of the present disclosure.

FIG. 14 is a second schematic structural diagram illustrating a picture displaying apparatus according to an embodiment of the present disclosure.

As shown in FIG. 14, the picture displaying apparatus provided in the embodiment of the present disclosure includes a second transmitting module 141 and a displaying module 142. The second transmitting module 141 is configured to transmit a first resolution of a display screen of a client to a server terminal, to enable the server terminal to adjust, according to the first resolution, a to-be-output picture to obtain an effective display picture, where the effective display picture is displayed at a same ratio as a ratio of the first resolution; and the displaying module 142 is configured to receive and display the effective display picture transmitted by the server terminal.

Further, the displaying module is specifically configured to:
receive a background picture transmitted by the server terminal; and
extract and display an effective display picture from the effective display area of the background picture, where the effective display area is partitioned from the background picture by the server terminal according to the first resolution, and the effective display picture is obtained by rearranging the to-be-output picture and projecting the rearranged to-be-output picture into the effective display area by the server terminal.

Further, the second transmitting module is specifically configured to transmit a device scheduling request, where the device scheduling request is used to schedule an idle server terminal, and the device scheduling request carries the first resolution of the display screen of the client, to enable the server terminal to parse the device scheduling request to obtain the first resolution of the display screen of the client.

The picture displaying apparatus provided in the embodiment of the present disclosure can be used to implement the technical solution in the foregoing method embodiments, and is implemented using the similar principles and produces the similar technical effects; detailed description will be omitted in the embodiment of the present disclosure herein.

Figure 15:
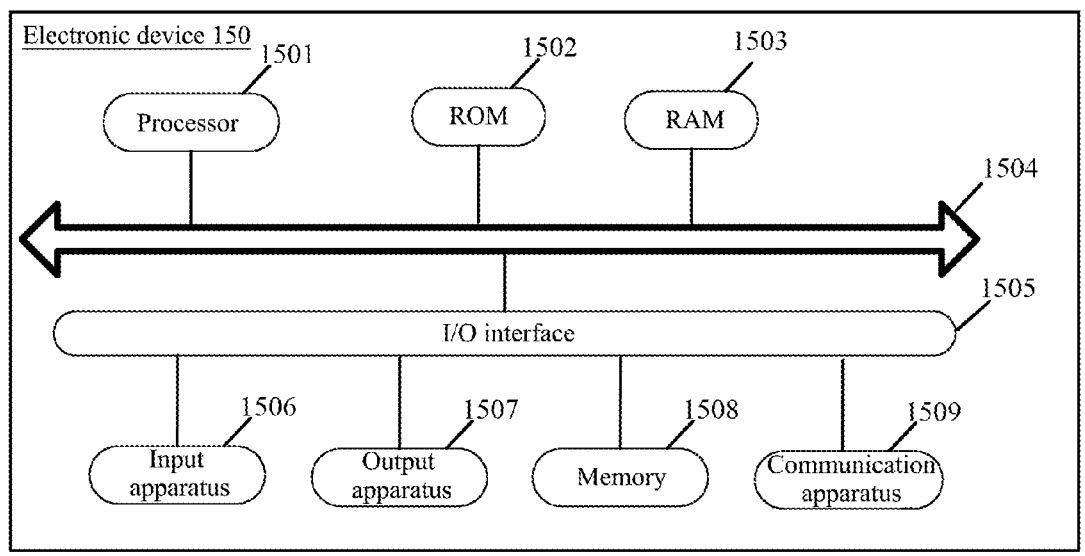
FIG. 15 is a schematic structural diagram illustrating hardware of an electronic device according to an embodiment of the present disclosure.

Reference is made to FIG. 15, which shows a schematic structural diagram of an electronic device 150 for implementing the embodiments of the present disclosure. The electronic device 150 may be a terminal device or a server. The terminal device may include, but is not limited to: a mobile terminal, such as a mobile phone, a notebook computer, a digital broadcast receiver, a personal digital assistant (Personal Digital Assistant, abbreviated as PDA), a tablet computer, a portable media player (Portable Media Player, abbreviated as PMP), and a vehicle-mounted terminal (such as vehicle-mounted navigation terminal); and a fixed terminal, such as a digital TV, and a desktop computer. The electronic device shown in FIG. 15 is merely an example, which should not impose any restrictions on functionalities and application scope of the embodiments of the present disclosure.

As shown in FIG. 15, the electronic device 150 may include a processor (such as a central processor, and a graphics processor) 1501, which may perform various appropriate actions and processes according to a program stored in a read only memory (Read Only Memory, abbreviated as ROM) 1502 or a program loaded into a random access memory (Random Access Memory, abbreviated as RAM) 1503 from a memory 1508. In the RAM 1503, various programs and data required for operations of the electronic device 150 are also stored. The processor 1501, the ROM 1502 and the RAM 1503 are connected to each other through a bus 1504. An input/output (I/O) interface 1505 is also connected to the bus 1504.

Generally, the following apparatuses may be connected to the I/O interface 1505: an input apparatus 1506, including, for example, a touch screen, a touch pad, a keyboard, a mouse, a camera, a microphone, an accelerometer, or a gyroscope; an output apparatus 1507, including, for example, a liquid crystal display (liquid crystal display, abbreviated as LCD), a speaker, or a vibrator; a memory 1508, including, for example, a magnetic tape, or a hard disk; and a communication apparatus 1509. The communication apparatus 1509 may enable the electronic device 150 to communicate wirelessly or wiredly with a further device for data exchange. Although FIG. 15 shows an electronic device 150 with various apparatuses, comprehensibly, there is no such requirement that all the apparatuses shown should be implemented or provided. Alternatively, more or fewer apparatuses may be implemented or provided.

Particularly, according to the embodiments of the present disclosure, the process described above with reference to the flowchart(s) may be implemented as a computer software program. For example, an embodiment of the present disclosure includes a computer program product including a computer program carried on a computer-readable medium, where the computer program includes program codes for performing the method shown in the flowchart(s). When the computer program is executed by a processor, the processor is enabled to perform the above functions as defined in the method according to the embodiments of the present disclosure. In such embodiments, the computer program may be downloaded and installed from the network through the communication apparatus 1509, or installed from the memory 1508 or from the ROM 1502. When executed by the processor 1501, the computer program performs the above-described functionalities defined in the method according to the embodiments of the present disclosure.

It should be noted that the above-described computer-readable medium in the present disclosure may be a computer-readable signal medium or a computer-readable storage medium or any combination thereof. The computer-readable storage medium may be, for example, but not limited to, an electrical, a magnetic, an optical, an electromagnetic, an infrared or a semiconductor system, apparatus or device, or any combination of the above. More specific examples of the computer-readable storage medium may include, but not limited to, an electrically connected portable computer disk with one or more wires, a hard disk, a random access memory (RAM), a read-only memory (ROM), an erasable programmable read-only memory (Erasable Programmable Read Only Memory, EPROM; or a flash memory), an optical fiber, a portable compact disc read-only memory (Compact Disc-Read Only Memory, CD-ROM), an optical storage device, a magnetic storage device, or any suitable combination of the above. In the present disclosure, the computer-readable storage medium may be any tangible medium in which a program is contained or stored. The program may be used by or in combination with an instruction execution system, apparatus or device. In the present disclosure, the computer-readable signal medium may include a data signal propagated in a baseband or as a part of a carrier wave, where computer-readable program codes are carried. This propagated data signal may be in various forms, including but not limited to electromagnetic signals, optical signals or any suitable combination of the above. The computer-readable signal medium may also be any computer-readable medium other than the computer-readable storage medium. The computer-readable signal medium may send, propagate or transmit the program for use by or in combination with the instruction execution system, apparatus or device. The program codes contained in the computer-readable medium may be transmitted using any suitable medium, including but not limited to: electric wires, optical cables, radio frequency (Radio Frequency, RF), etc., or any suitable combination of the above.

The above-described computer-readable medium may be included in the above-described electronic device; or it may exist alone without being assembled into the electronic device.

The above-described computer-readable medium carries one or more computer programs which, when being executed by the electronic device, cause the electronic device to execute the method according to the foregoing embodiments.

The computer program contains computer program codes configured to perform the operations of the present disclosure and written in one or more programming languages or a combination thereof, including object-oriented programming languages, such as Java, Smalltalk and C++; and conventional procedural programming languages, such as "C" language or similar programming languages. The program codes may be completely executed on a user computer, partially executed on a user computer, executed as an independent software package, partially executed on a user computer and partially executed on a remote computer, or completely executed on a remote computer or a server. In a case involving the remote computer, the remote computer may be connected to a user computer through any kind of networks, including a local area network (Local Area Network, abbreviated as LAN) or a wide area network (Wide Area Network, abbreviated as WAN), or may be connected to an external computer (for example, connecting through Internet with use of an Internet service provider).

The flowcharts and block diagrams in the drawings illustrate architectures, functionalities and operations of possible implementations of the system, the method and the computer program product according to various embodiments of the present disclosure. In this regard, each block in the flowcharts or block diagrams may represent a module, a program segment or part of codes, which contains one or more executable instructions for implementing specified logical functionalities. It should also be noted that, in some alternative implementations, the functionalities marked in the blocks may also occur in a different order from that marked in the drawings. For example, two blocks shown in succession may actually be executed in parallel substantially, and sometimes they can be executed in a reverse order, depending on the functionalities involved. It should also be noted that each block in the block diagrams and/or the flowcharts, and a combination of blocks in the block diagrams and/or the flowcharts, may be implemented by a dedicated hardware-based system that performs specified functionalities or operations, or may be implemented by a combination of dedicated hardware and computer instructions.

The units involved in the embodiments described in the present disclosure may be implemented by means of software or hardware. In some cases, unit names do not limit the units. For example, the first acquiring unit can also be described as "a unit acquiring at least two Internet Protocol addresses."

The functionalities described above herein may be at least partially performed by one or more hardware logic components. For example, non-restrictively, the hardware logic components that may be used include the following exemplary types: a field programmable gate array (Field Programmable Gate Array, FPGA), an application specific integrated circuit (Application Specific Integrated Circuit, ASIC), an application specific standard product (Application Specific Standard Product, ASSP), a system on chip (System on Chip, SOC), a complex programmable logic device (Complex Programmable Logic Device, CPLD) and the like.

In the context of the present disclosure, the computer-readable medium may be a tangible medium in which a program for use by or in combination with an instruction execution system, apparatus or device can be contained or stored. The computer-readable medium may be a computer-readable signal medium or a computer-readable storage medium. The computer-readable medium may include, but not limited to, an electronic, a magnetic, an optical, an electromagnetic, an infrared, or a semiconductor system, apparatus or device, or any suitable combination of the foregoing. More specific examples of the computer-readable storage medium may include an electrically connected portable computer disk based on one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In a first aspect, according to one or more embodiments of the present disclosure, provided is a picture displaying method applied to a server terminal. The method includes:

acquiring a first resolution of a display screen of a client;

adjusting, according to the first resolution, a to-be-output picture to obtain an effective display picture, where the effective display picture is displayed at a same ratio as a ratio of the first resolution; and transmitting the effective display picture to the client for display.

According to one or more embodiments of the present disclosure, the adjusting, according to the first resolution, the to-be-output picture to obtain the effective display picture includes:

determining, according to the first resolution, an effective display area of the to-be-output picture in a virtual display screen of the server terminal, where the effective display area has a same ratio as a ratio of the first resolution; and rearranging the to-be-output picture and projecting the rearranged to-be-output picture into the effective display area, to obtain the effective display picture.

According to one or more embodiments of the present disclosure, the determining, according to the first resolution, the effective display area of the to-be-output picture in the virtual display screen of the server terminal includes:

creating a background picture, where the background picture has a second resolution that is the same as a resolution of the virtual display screen of the server terminal;

determining a width and a height of the effective display area according to the first resolution and the second resolution;

determining coordinate information of the effective display area relative to the background picture according to the height and the width of the effective display area; and partitioning the effective display area from the background picture according to the coordinate information.

According to one or more embodiments of the present disclosure, the determining the width and the height of the effective display area according to the first resolution and the second resolution includes:

determining a ratio value of a first vertical pixel to a first horizontal pixel of the first resolution;

if it is determined that a second vertical pixel of the second resolution is greater than a product of a second horizontal pixel of the second resolution and the ratio value, determining the second horizontal pixel as the width of the effective display area, and determining the product of the second horizontal pixel and the ratio value as the height of the effective display area; and if it is determined that the second vertical pixel of the second resolution is less than or equal to the product of the second horizontal pixel of the second resolution and the ratio value, determining the second vertical pixel as the height of the effective display area, and dividing the second vertical pixel by the ratio value to determine a division result as the width of the effective display area.

According to one or more embodiments of the present disclosure, the determining the coordinate information of the effective display area relative to the background picture according to the height and the width of the effective display area includes:

determining an abscissa and an ordinate of a first vertex of the effective display area, where the abscissa of the first vertex is half of a difference between the second horizontal pixel and the width of the effective display area, and the ordinate of the first vertex is half of a difference between the second vertical pixel and the height of the effective display area; and determining an abscissa and an ordinate of a second vertex of the effective display area, where the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

According to one or more embodiments of the present disclosure, the rearranging the to-be-output picture and the projecting the rearranged to-be-output picture into the effective display area include:

adjusting a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area; and projecting the adjusted to-be-output picture into the effective display area from the background picture.

According to one or more embodiments of the present disclosure, the transmitting the effective display picture to the client for display includes:

transmitting the projected background picture to the client, to enable the client to extract and display the effective display picture from the effective display area of the background picture.

According to one or more embodiments of the present disclosure, the acquiring the first resolution of the display screen of the client includes:

receiving a device scheduling request transmitted by the client, where the device scheduling request is used to schedule an idle server terminal, and the device scheduling request carries the first resolution of the display screen of the client; and when it is determined that the idle server terminal requested by the client for scheduling is a server terminal itself, parsing the device scheduling request to obtain the first resolution of the display screen of the client.

According to one or more embodiments of the present disclosure, the acquiring the first resolution of the display screen of the client includes:

transmitting a first indication information to the client, where the first indication information is used to be indicative of transmitting, by the client, the first resolution of the display screen to a server terminal; and receiving the first resolution of the display screen returned by the client.

In a second aspect, according to one or more embodiments of the present disclosure, provided is a picture displaying method applied to a client. The method includes:

transmitting a first resolution of a display screen of the client to a server terminal, to enable the server terminal to adjust, according to the first resolution, a to-be-output picture to obtain an effective display picture, where the effective display picture is displayed at a same ratio as a ratio of the first resolution; and receiving and displaying the effective display picture transmitted by the server terminal.

According to one or more embodiments of the present disclosure, the receiving and the displaying the effective display picture transmitted by the server terminal include:

receiving a background picture transmitted by the server terminal; and extracting and displaying an effective display picture from the effective display area of the background picture, where the effective display area is partitioned from the background picture by the server terminal according to the first resolution, and the effective display picture is obtained by rearranging the to-be-output picture and projecting the rearranged to-be-output picture into the effective display area by the server terminal.

According to one or more embodiments of the present disclosure, the transmitting the first resolution of the display screen of the client to the server terminal includes:

transmitting a device scheduling request, where the device scheduling request is used to schedule an idle server terminal, and the device scheduling request carries the first resolution of the display screen of the client, to enable the server terminal to parse the device scheduling request to obtain the first resolution of the display screen of the client.

In a third aspect, according to one or more embodiments of the present disclosure, provided is a picture displaying apparatus. The picture displaying apparatus includes an acquiring module, an adapting module and a first transmitting module; among them, the acquiring module is configured to acquire a first resolution of a display screen of a client; the adapting module is configured to adjust, according to the first resolution, a to-be-output picture to obtain an effective display picture, where the effective display picture is displayed at a same ratio as a ratio of the first resolution; and the first transmitting module is configured to transmit the effective display picture to the client for display.

According to one or more embodiments of the present disclosure, the adapting module includes:
  a determining unit, configured to determine, according to the first resolution, an effective display area of the to-be-output picture in a virtual display screen of a server terminal, where the effective display area has a same ratio as a ratio of the first resolution; and
  a projection unit, configured to rearrange the to-be-output picture and project the rearranged to-be-output picture into the effective display area, to obtain the effective display picture.

According to one or more embodiments of the present disclosure, the determining unit includes:
  a creating sub-unit, configured to create a background picture, where the background picture has a second resolution that is the same as a resolution of the virtual display screen of the server terminal;
  a calculating sub-unit, configured to determine a width and a height of the effective display area according to the first resolution and the second resolution;
  the calculating sub-unit is further configured to determine coordinate information of the effective display area relative to the background picture according to the height and the width of the effective display area; and
  a partitioning sub-unit, configured to partition the effective display area from the background picture according to the coordinate information.

According to one or more embodiments of the present disclosure, the calculating sub-unit is specifically configured to:
  determine a ratio value of a first vertical pixel to a first horizontal pixel of the first resolution;
  if it is determined that a second vertical pixel of the second resolution is greater than a product of a second horizontal pixel of the second resolution and the ratio value, determine the second horizontal pixel as the width of the effective display area, and determine the product of the second horizontal pixel and the ratio value as the height of the effective display area; and
  if it is determined that the second vertical pixel of the second resolution is less than or equal to the product of the second horizontal pixel of the second resolution and the ratio value, determine the second vertical pixel as the height of the effective display area, and divide the second vertical pixel by the ratio value to determine a division result as the width of the effective display area.

According to one or more embodiments of the present disclosure, the calculating sub-unit is specifically configured to:
  determine an abscissa and an ordinate of a first vertex of the effective display area, where the abscissa of the first vertex is half of a difference between the second horizontal pixel and the width of the effective display area, and the ordinate of the first vertex is half of a difference between the second vertical pixel and the height of the effective display area; and
  determine an abscissa and an ordinate of a second vertex of the effective display area, where the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

According to one or more embodiments of the present disclosure, the projection unit is specifically configured to:
  adjust a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area; and
  project the adjusted to-be-output picture into the effective display area from the background picture.

According to one or more embodiments of the present disclosure, the first transmitting module is specifically configured to:
  transmit the projected background picture to the client, to enable the client to extract and display the effective display picture from the effective display area of the background picture.

According to one or more embodiments of the present disclosure, the acquiring module is specifically configured to: receive a device scheduling request transmitted by the client, where the device scheduling request is used to schedule an idle server terminal, and the device scheduling request carries the first resolution of the display screen of the client; and when it is determined that the idle server terminal requested by the client for scheduling is a server terminal itself, parse the device scheduling request to obtain the first resolution of the display screen of the client.

In a fourth aspect, according to one or more embodiments of the present disclosure, provided is a picture displaying apparatus. The picture displaying apparatus includes a second transmitting module and a displaying module. The second transmitting module is configured to transmit a first resolution of a display screen of a client to a server terminal, to enable the server terminal to adjust, according to the first resolution, a to-be-output picture to obtain an effective display picture, where the effective display picture is displayed at a same ratio as a ratio of the first resolution; and the displaying module is configured to receive and display the effective display picture transmitted by the server terminal.

According to one or more embodiments of the present disclosure, the displaying module is specifically configured to:
  receive a background picture transmitted by the server terminal; and
  extract and display an effective display picture from the effective display area of the background picture, where the effective display area is partitioned from the background picture by the server terminal according to the first resolution, and the effective display picture is obtained by rearranging the to-be-output picture and projecting the rearranged to-be-output picture into the effective display area by the server terminal.

According to one or more embodiments of the present disclosure, the second transmitting module is specifically configured to transmit a device scheduling request, where the device scheduling request is used to schedule an idle server terminal, and the device scheduling request carries the first resolution of the display screen of the client, to enable the server terminal to parse the device scheduling request to obtain the first resolution of the display screen of the client.

In a fifth aspect, an embodiment of the present disclosure provides an electronic device, including: at least one processor and a memory;

where the memory has, stored therein, computer-executable instructions; and the at least one processor executes the computer-executable instructions stored in the memory, to enable the at least one processor to execute the picture displaying method described above in the first aspect and various possible designs of the first aspect as well as the second aspect and various possible designs of the second aspect.

In a sixth aspect, an embodiment of the present disclosure provides a computer-readable storage medium in which computer-executable instructions are stored, where the picture displaying method described above in the first aspect and various possible designs of the first aspect as well as the second aspect and various possible designs of the second aspect is implemented when the computer-executable instructions are executed by a processor.

In a seventh aspect, an embodiment of the present disclosure provides a computer program product, including: a computer program, where the computer program, when being executed by a processor, enables the processor to implement the picture displaying method described above in the first aspect and various possible designs of the first aspect as well as the second aspect and various possible designs of the second aspect.

In an eighth aspect, an embodiment of the present disclosure provides a computer program. The computer program, when being executed by a processor, enables the processor to implement the picture displaying method described above in the first aspect and various possible designs of the first aspect as well as the second aspect and various possible designs of the second aspect.

The above descriptions are only preferred embodiments of the present disclosure and illustrations of the applied technical principles. Those skilled in the art should understand that the scope involved in the present disclosure is not limited to the technical schemes formed from a specific combination of the above-described technical features, but covers other technical schemes formed from any combination of the above-described technical features or their equivalent features without departing from the above disclosed concept, such as a technical scheme formed from replacement of the above-described features with technical features having similar functionalities to those disclosed in (but not limited to) the present disclosure.

Furthermore, although the operations are depicted in a particular order, this does not mean a requirement that these operations should be performed in the particular order shown or in a sequential order. Under certain circumstances, multitasking and parallel processing may be beneficial. Similarly, although the above discussion contains several specific implementation details, these should not be interpreted as limitations on the scope of the present disclosure. Some features described in the context of separate embodiments also may be implemented in a single embodiment in combination. On the contrary, various features described in the context of a single embodiment also may be implemented in multiple embodiments separately or in any suitable sub-combinations.

Although the subject matters have been described in language specific to structural features and/or methodological logical actions, it will be appreciated that the subject matters defined in the appended claims are not necessarily limited to the specific features or actions described above. On the contrary, the specific features and actions described above are only exemplary forms for implementing the claims.

What is claimed is:

1. A picture displaying method applied to a server terminal, comprising:

acquiring a first resolution of a display screen of a client;

adjusting, according to the first resolution, a to-be-output picture to obtain an effective display picture, wherein the effective display picture is displayed at a same ratio as a ratio of the first resolution; and transmitting the effective display picture to the client for display;

wherein the acquiring the first resolution of the display screen of the client comprises:

receiving a device scheduling request transmitted by the client, wherein the device scheduling request is used to schedule an idle server terminal, and the device scheduling request carries the first resolution of the display screen of the client; and when it is determined that the idle server terminal requested by the client for scheduling is the server terminal itself, parsing the device scheduling request to obtain the first resolution of the display screen of the client.

2. The method according to claim 1, wherein the adjusting, according to the first resolution, the to-be-output picture to obtain the effective display picture comprises:

determining, according to the first resolution, an effective display area of the to-be-output picture in a virtual display screen of the server terminal, wherein the effective display area has a same ratio as a ratio of the first resolution; and rearranging the to-be-output picture and projecting the rearranged to-be-output picture into the effective display area, to obtain the effective display picture.

3. The method according to claim 2, wherein the determining, according to the first resolution, the effective display area of the to-be-output picture in the virtual display screen of the server terminal comprises:

creating a background picture, wherein the background picture has a second resolution that is the same as a resolution of the virtual display screen of the server terminal;

determining a width and a height of the effective display area according to the first resolution and the second resolution;

determining coordinate information of the effective display area relative to the background picture according to the height and the width of the effective display area; and partitioning the effective display area from the background picture according to the coordinate information.

4. The method according to claim 3, wherein the determining the width and the height of the effective display area according to the first resolution and the second resolution comprises:

determining a ratio value of a first vertical pixel to a first horizontal pixel of the first resolution;

if it is determined that a second vertical pixel of the second resolution is greater than a product of a second horizontal pixel of the second resolution and the ratio value, determining the second horizontal pixel as the width of the effective display area, and determining the product of the second horizontal pixel and the ratio value as the height of the effective display area; and if it is determined that the second vertical pixel of the second resolution is less than or equal to the product of the second horizontal pixel of the second resolution and the ratio value, determining the second vertical pixel as the height of the effective display area, and dividing the second vertical pixel by the ratio value to determine a division result as the width of the effective display area.

5. The method according to claim 4, wherein the determining the coordinate information of the effective display area relative to the background picture according to the height and the width of the effective display area comprises:
determining an abscissa and an ordinate of a first vertex of the effective display area, wherein the abscissa of the first vertex is half of a difference between the second horizontal pixel and the width of the effective display area, and the ordinate of the first vertex is half of a difference between the second vertical pixel and the height of the effective display area; and
determining an abscissa and an ordinate of a second vertex of the effective display area, wherein the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

6. The method according to claim 3, wherein the rearranging the to-be-output picture and the projecting the rearranged to-be-output picture into the effective display area comprise:
adjusting a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area; and
projecting the adjusted to-be-output picture into the effective display area from the background picture;
wherein the transmitting the effective display picture to the client for display comprises:
transmitting the projected background picture to the client, to enable the client to extract and display the effective display picture from the effective display area of the background picture.

7. The method according to claim 1, wherein the acquiring the first resolution of the display screen of the client comprises:
transmitting a first indication information to the client, wherein the first indication information is used to be indicative of transmitting, by the client, the first resolution of the display screen to a server terminal; and
receiving the first resolution of the display screen returned by the client.

8. A non-transitory computer-readable storage medium in which computer-executable instructions are stored, wherein the picture displaying method according to claim 1 is implemented when the computer-executable instructions are executed by a processor.

9. A picture displaying method applied to a client, comprising:
transmitting a first resolution of a display screen of the client to a server terminal, to enable the server terminal to adjust, according to the first resolution, a to-be-output picture to obtain an effective display picture, wherein the effective display picture is displayed at a same ratio as a ratio of the first resolution; and
receiving and displaying the effective display picture transmitted by the server terminal;
wherein the transmitting the first resolution of the display screen of the client to the server terminal comprises:
transmitting a device scheduling request, wherein the device scheduling request is used to schedule an idle server terminal, and the device scheduling request carries the first resolution of the display screen of the client, to enable the server terminal to parse the device scheduling request to obtain the first resolution of the display screen of the client.

10. The method according to claim 9, wherein the receiving and the displaying the effective display picture transmitted by the server terminal comprise:
receiving a background picture transmitted by the server terminal; and
extracting and displaying an effective display picture from the effective display area of the background picture, wherein the effective display area is partitioned from the background picture by the server terminal according to the first resolution, and the effective display picture is obtained by rearranging the to-be-output picture and projecting the rearranged to-be-output picture into the effective display area by the server terminal.

11. A picture displaying apparatus, comprising:
at least one processor and a memory;
wherein the memory has, stored therein, computer-executable instructions; and
the at least one processor executes the computer-executable instructions stored in the memory, to enable the at least one processor to:
acquire a first resolution of a display screen of a client;
receive a device scheduling request transmitted by the client, wherein the device scheduling request is used to schedule an idle server terminal, and the device scheduling request carries the first resolution of the display screen of the client; and
when it is determined that the idle server terminal requested by the client for scheduling is a server terminal itself, parse the device scheduling request to obtain the first resolution of the display screen of the client;
adjust, according to the first resolution, a to-be-output picture to obtain an effective display picture, wherein the effective display picture is displayed at a same ratio as a ratio of the first resolution; and
transmit the effective display picture to the client for display.

12. The picture displaying apparatus according to claim 11, wherein the at least one processor is configured to:
determine, according to the first resolution, an effective display area of the to-be-output picture in a virtual display screen of the server terminal, wherein the effective display area has a same ratio as a ratio of the first resolution; and
rearrange the to-be-output picture and project the rearranged to-be-output picture into the effective display area, to obtain the effective display picture.

13. The picture displaying apparatus according to claim 12, wherein the at least one processor is configured to:
create a background picture, wherein the background picture has a second resolution that is the same as a resolution of the virtual display screen of the server terminal;

determine a width and a height of the effective display area according to the first resolution and the second resolution;
determine coordinate information of the effective display area relative to the background picture according to the height and the width of the effective display area; and
partition the effective display area from the background picture according to the coordinate information.

14. The picture displaying apparatus according to claim 13, wherein the at least one processor is configured to:
determine a ratio value of a first vertical pixel to a first horizontal pixel of the first resolution;
if it is determined that a second vertical pixel of the second resolution is greater than a product of a second horizontal pixel of the second resolution and the ratio value, determine the second horizontal pixel as the width of the effective display area, and determine the product of the second horizontal pixel and the ratio value as the height of the effective display area; and
if it is determined that the second vertical pixel of the second resolution is less than or equal to the product of the second horizontal pixel of the second resolution and the ratio value, determine the second vertical pixel as the height of the effective display area, and divide the second vertical pixel by the ratio value to determine a division result as the width of the effective display area.

15. The picture displaying apparatus according to claim 14, wherein the at least one processor is configured to:
determine an abscissa and an ordinate of a first vertex of the effective display area, wherein the abscissa of the first vertex is half of a difference between the second horizontal pixel and the width of the effective display area, and the ordinate of the first vertex is half of a difference between the second vertical pixel and the height of the effective display area; and
determine an abscissa and an ordinate of a second vertex of the effective display area, wherein the second vertex is a diagonal vertex of the first vertex, the abscissa of the second vertex is a sum of the abscissa of the first vertex and the width of the effective display area, and the ordinate of the second vertex is a sum of the ordinate of the first vertex and the height of the effective display area.

16. The picture displaying apparatus according to claim 13, wherein the at least one processor is configured to:
adjust a vertical pixel and a horizontal pixel of the to-be-output picture according to the height and the width of the effective display area in such a manner that the vertical pixel of the to-be-output picture is equal to the height of the effective display area and the horizontal pixel of the to-be-output picture is equal to the width of the effective display area;
project the adjusted to-be-output picture into the effective display area from the background picture; and
transmit the projected background picture to the client, to enable the client to extract and display the effective display picture from the effective display area of the background picture.

17. The picture displaying apparatus according to claim 11, wherein the at least one processor is configured to:
transmit, by the server terminal, a first indication information to the client, wherein the first indication information is used to be indicative of transmitting, by the client, the first resolution of the display screen to a server terminal; and
receive the first resolution of the display screen returned by the client.

* * * * *